(12) United States Patent
Kawawa

(10) Patent No.: US 9,571,729 B2
(45) Date of Patent: Feb. 14, 2017

(54) IMAGE PICKUP APPARATUS, IMAGE PICKUP SYSTEM, METHOD FOR CONTROLLING IMAGE PICKUP APPARATUS, METHOD FOR CONTROLLING IMAGE PICKUP SYSTEM, AND PROGRAM

(71) Applicant: CANON KABUSHIKI KAISHA, Tokyo (JP)

(72) Inventor: Yasuhiro Kawawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/463,529

(22) Filed: Aug. 19, 2014

(65) Prior Publication Data

US 2015/0054969 A1 Feb. 26, 2015

(30) Foreign Application Priority Data

Aug. 23, 2013 (JP) .................................. 2013-173363

(51) Int. Cl.
| | |
|---|---|
| H04N 5/232 | (2006.01) |
| H04N 5/76 | (2006.01) |
| H04N 7/18 | (2006.01) |
| H04N 5/272 | (2006.01) |

(52) U.S. Cl.
CPC ............ *H04N 5/23229* (2013.01); *H04N 5/76* (2013.01); *H04N 7/183* (2013.01); *H04N 5/272* (2013.01)

(58) Field of Classification Search
CPC ...... H04N 5/23229; H04N 5/76; H04N 5/272; H04N 7/183; H04N 5/23206
See application file for complete search history.

(56) References Cited

U.S. PATENT DOCUMENTS

| | | | |
|---|---|---|---|
| 6,452,597 B1 * | 9/2002 | Goldberg | ................. G09G 5/00 340/7.55 |
| 2003/0137589 A1 * | 7/2003 | Miyata | ............. G08B 13/19686 348/211.7 |

FOREIGN PATENT DOCUMENTS

| | | |
|---|---|---|
| JP | 9-163258 A | 6/1997 |
| JP | 11-146275 A | 5/1999 |

* cited by examiner

*Primary Examiner* — Christopher K Peterson
(74) *Attorney, Agent, or Firm* — Canon USA, Inc. IP Division

(57) ABSTRACT

A monitoring camera includes an image pickup unit which captures an image of an object, a communication unit which receives superimposition information from a client apparatus through an IP network, a controller which determines whether the received superimposition information is larger than a first amount, an OSD generation unit which outputs part of the received superimposition information when the superimposition information is larger than the first amount and outputs the received superimposition information when the superimposition information is not larger than the first amount, and a compressing/encoding unit which superimposes the output superimposition information on the captured image.

9 Claims, 17 Drawing Sheets

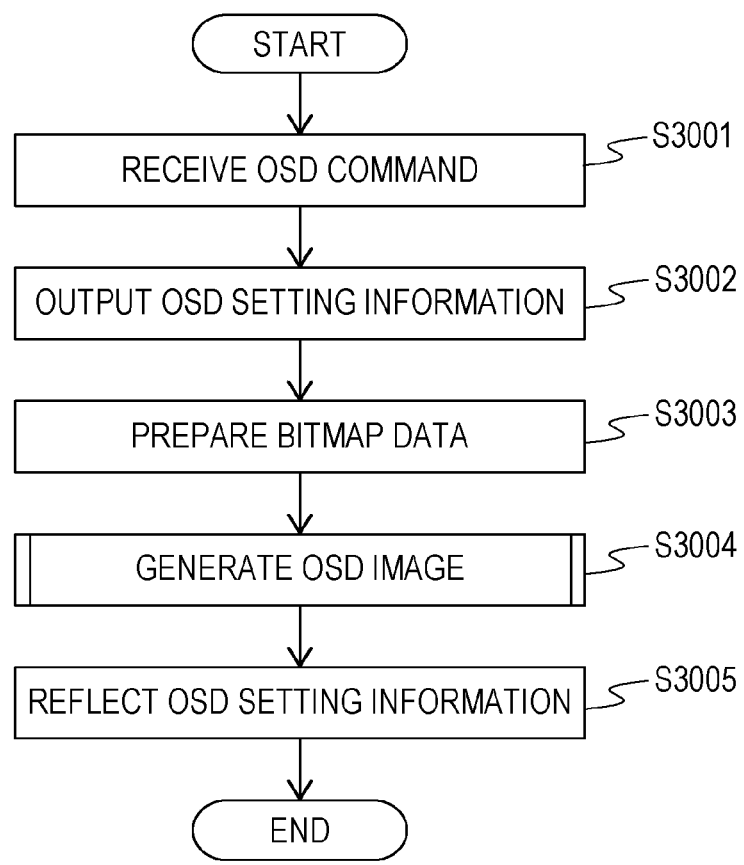

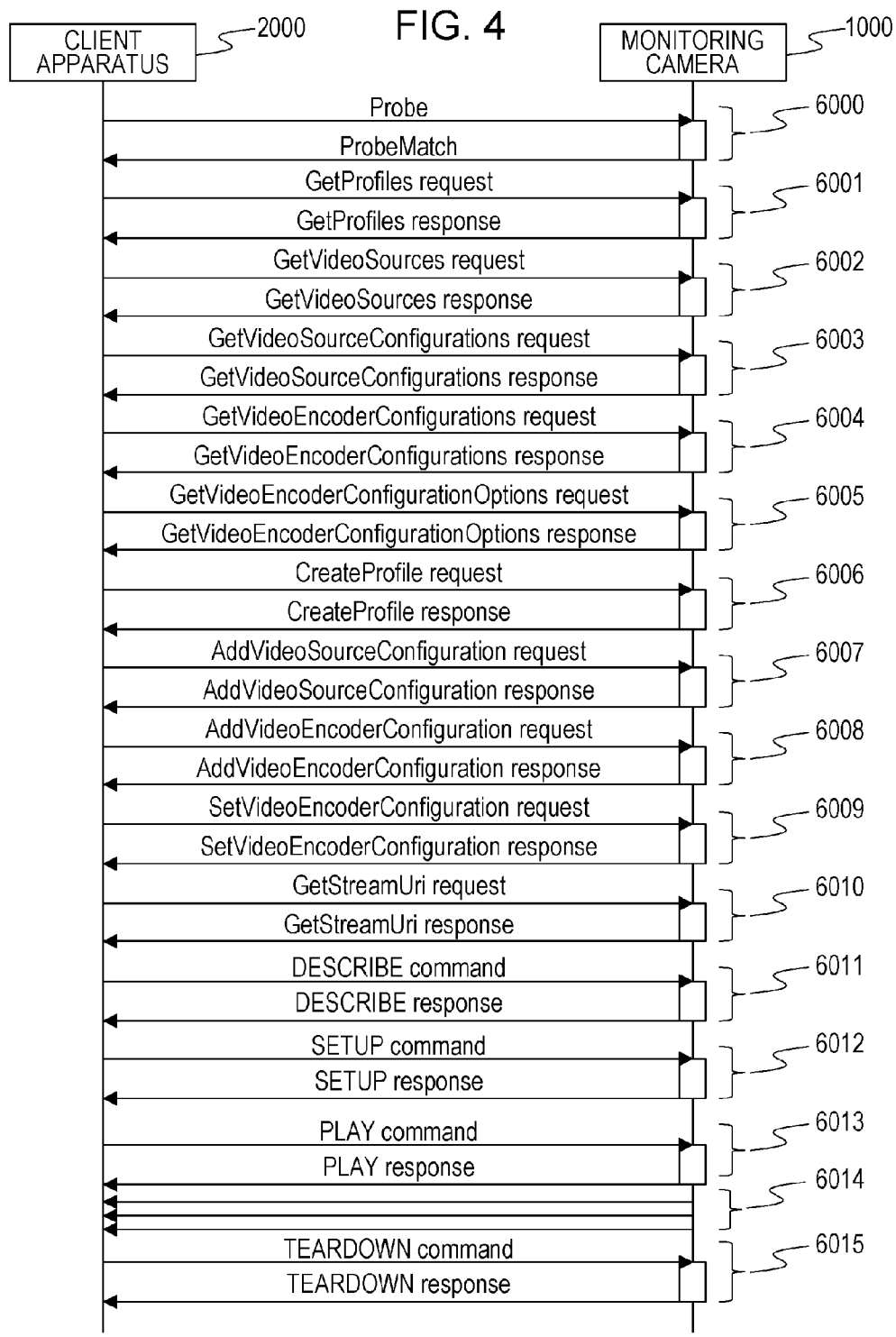

FIG. 6A

```
<xs:complexType name="OSDConfiguration">
    <xs:complexContent>
        <xs:extension base="tt:DeviceEntity">
            <xs:sequence>
                <xs:element name="VideoSourceConfigurationToken" type="tt:OSDReference"/>
                <xs:element name="Type" type="tt:OSDType"/>
                <xs:element name="Position" type="tt:OSDPosConfiguration"/>
                <xs:element name="TextString" type="tt:OSDTextConfiguration" minOccurs="0"/>
                <xs:element name="Image" type="tt:OSDImgConfiguration" minOccurs="0"/>
                <xs:element name="Extension" type="tt:OSDConfigurationExtension" minOccurs="0"/>
            </xs:sequence>
            <xs:anyAttribute processContents="lax"/>
        </xs:extension>
    </xs:complexContent>
</xs:complexType>
```

FIG. 6B

```
<xs:complexType name="OSDReference">
    <xs:simpleContent>
        <xs:extension base="tt:ReferenceToken">
            <xs:anyAttribute processContents="lax"/>
        </xs:extension>
    </xs:simpleContent>
</xs:complexType>
```

FIG. 6C

```
<xs:simpleType name="OSDType">
    <xs:restriction base="xs:string">
        <xs:enumeration value="Text"/>
        <xs:enumeration value="Image"/>
        <xs:enumeration value="Extended"/>
    </xs:restriction>
</xs:simpleType>
```

FIG. 6D

```
<xs:complexType name="OSDPosConfiguration">
    <xs:sequence>
        <xs:element name="Type" type="xs:string"/>
        <xs:element name="Pos" type="tt:Vector" minOccurs="0"/>
        <xs:element name="Extension" type="tt:OSDPosConfigurationExtension" minOccurs="0"/>
    </xs:sequence>
    <xs:anyAttribute processContents="lax"/>
</xs:complexType>
```

FIG. 6E

```
<xs:complexType name="OSDTextConfiguration">
    <xs:sequence>
        <xs:element name="Type" type="xs:string"/>
        <xs:element name="DateFormat" type="xs:string" minOccurs="0"/>
        <xs:element name="TimeFormat" type="xs:string" minOccurs="0"/>
        <xs:element name="FontSize" type="xs:int" minOccurs="0"/>
        <xs:element name="FontColor" type="tt:OSDColor" minOccurs="0"/>
        <xs:element name="BackgroundColor" type="tt:OSDColor" minOccurs="0"/>
        <xs:element name="PlainText" type="xs:string" minOccurs="0"/>
        <xs:element name="Extension" type="tt:OSDTextConfigurationExtension" minOccurs="0"/>
    </xs:sequence>
    <xs:anyAttribute processContents="lax"/>
</xs:complexType>
```

FIG. 6F

```
<xs:complexType name="OSDImgConfiguration">
    <xs:sequence>
        <xs:element name="ImgPath" type="xs:anyURI"/>
        <xs:element name="Extension" type="tt:OSDImgConfigurationExtension" minOccurs="0"/>
    </xs:sequence>
    <xs:anyAttribute processContents="lax"/>
</xs:complexType>
```

FIG. 6G

```
<xs:complexType name="OSDConfigurationExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 7A

```
<xs:complexType name="OSDConfigurationOptions">
    <xs:sequence>
        <xs:element name="MaximumNumberOfOSDs" type="xs:int" />
        <xs:element name="Type" type="tt:OSDType" maxOccurs="unbounded" />
        <xs:element name="PositionOption" type="xs:string" maxOccurs="unbounded" />
        <xs:element name="TextOption" type="tt:OSDTextOptions" minOccurs="0" />
        <xs:element name="ImageOption" type="tt:OSDImgOptions" minOccurs="0" />
        <xs:element name="Extension" type="tt:OSDConfigurationOptionsExtension" minOccurs="0"/>
    </xs:sequence>
    <xs:anyAttribute processContents="lax"/>
</xs:complexType>
```

FIG. 7B

```
<xs:complexType name="OSDTextOptions">
    <xs:sequence>
        <xs:element name="Type" type="xs:string" maxOccurs="unbounded"/>
        <xs:element name="FontSizeRange" type="tt:IntRange" minOccurs="0"/>
        <xs:element name="DateFormat" type="xs:string" minOccurs="0" maxOccurs="unbounded"/>
        <xs:element name="TimeFormat" type="xs:string" minOccurs="0" maxOccurs="unbounded"/>
        <xs:element name="FontColor" type="tt:OSDColorOptions" minOccurs="0"/>
        <xs:element name="BackgroundColor" type="tt:OSDColorOptions" minOccurs="0"/>
        <xs:element name="Extension" type="tt:OSDTextOptionsExtension" minOccurs="0"/>
    </xs:sequence>
    <xs:anyAttribute processContents="lax"/>
</xs:complexType>
```

FIG. 7C

```
<xs:complexType name="OSDImgOptions">
    <xs:sequence>
        <xs:element name="ImagePath" type="xs:anyURI" maxOccurs="unbounded"/>
        <xs:element name="Extension" type="tt:OSDImgOptionsExtension" minOccurs="0"/>
    </xs:sequence>
    <xs:anyAttribute processContents="lax"/>
</xs:complexType>
```

FIG. 7D

```
<xs:complexType name="OSDConfigurationOptionsExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 7E

```
<xs:complexType name="IntRange">
    <xs:sequence>
        <xs:element name="Min" type="xs:int"/>
        <xs:element name="Max" type="xs:int"/>
    </xs:sequence>
</xs:complexType>
```

FIG. 8A

```
<xs:complexType name="OSDColorOptions">
    <xs:sequence>
        <xs:element name="Color" type="tt:ColorOptions" minOccurs="0"/>
        <xs:element name="Transparent" type="tt:IntRange" minOccurs="0"/>
        <xs:element name="Extension" type="tt:OSDColorOptionsExtension" minOccurs="0"/>
    </xs:sequence>
    <xs:anyAttribute processContents="lax"/>
</xs:complexType>
```

FIG. 8B

```
<xs:complexType name="OSDTextOptionsExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 8C

```
<xs:complexType name="ColorOptions">
    <xs:sequence>
        <xs:choice>
            <xs:element name="ColorList" type="tt:Color" maxOccurs="unbounded"/>
            <xs:element name="ColorspaceRange" type="tt:ColorspaceRange" maxOccurs="unbounded"/>
        </xs:choice>
    </xs:sequence>
    <xs:anyAttribute processContents="lax"/>
</xs:complexType>
```

FIG. 8D

```
<xs:complexType name="Color">
    <xs:attribute name="X" type="xs:float" use="required"/>
    <xs:attribute name="Y" type="xs:float" use="required"/>
    <xs:attribute name="Z" type="xs:float" use="required"/>
    <xs:attribute name="Colorspace" type="xs:anyURI"/>
</xs:complexType>
```

FIG. 8E

```
<xs:complexType name="ColorspaceRange">
    <xs:sequence>
        <xs:element name="X" type="tt:FloatRange"/>
        <xs:element name="Y" type="tt:FloatRange"/>
        <xs:element name="Z" type="tt:FloatRange"/>
        <xs:element name="Colorspace" type="xs:anyURI"/>
    </xs:sequence>
    <xs:anyAttribute processContents="lax"/>
</xs:complexType>
```

FIG. 8F

```
<xs:complexType name="FloatRange">
    <xs:sequence>
        <xs:element name="Min" type="xs:float"/>
        <xs:element name="Max" type="xs:float"/>
    </xs:sequence>
</xs:complexType>
```

FIG. 10A

```
<?xml version="1.0" encoding="UTF-8"?>
<SOAP-ENV:Envelope
 xmlns:SOAP-ENV="http://www.w3.org/2003/05/soap-envelope"
 xmlns:tt="http://www.onvif.org/ver10/schema"
 xmlns:trt="http://www.onvif.org/ver10/media/wsdl" >
<SOAP-ENV:Header>
. . . . .
</SOAP-ENV:Header>
<SOAP-ENV:Body>
    <trt:CreateOSD>
         <trt:OSD token="osd-3">
              <tt:VideoSourceConfigurationToken>0</tt:VideoSourceConfigurationToken>
              <tt:Type>Text</tt:Type>
              <tt:Position>
                  <tt:Type>LowerLeft</tt:Type>
              </tt:Position>
              <tt:TextString>
                  <tt:Type>Plain</tt:Type>
                  <tt:PlainText>West side gate No.01</tt:PlainText>
              </tt:TextString>
         </trt:OSD>
    </trt:CreateOSD>
</SOAP-ENV:Body>
</SOAP-ENV:Envelope>
```

FIG. 10B

```
<?xml version="1.0" encoding="UTF-8"?>
<SOAP-ENV:Envelope
. . . . .
 xmlns:SOAP-ENV="http://www.w3.org/2003/05/soap-envelope"
 xmlns:tt="http://www.onvif.org/ver10/schema"
 xmlns:trt="http://www.onvif.org/ver10/media/wsdl" >
<SOAP-ENV:Header>
. . . . .
</SOAP-ENV:Header>
<SOAP-ENV:Body>
    <trt:CreateOSDResponse>
         <trt:OSDToken>osd-3</trt:OSDToken>
    </trt:CreateOSDResponse>
</SOAP-ENV:Body>
</SOAP-ENV:Envelope>
```

FIG. 11A
```xml
<?xml version="1.0" encoding="UTF-8"?>
<SOAP-ENV:Envelope
.....
xmlns:SOAP-ENV="http://www.w3.org/2003/05/soap-envelope"
xmlns:tt="http://www.onvif.org/ver10/schema"
xmlns:trt="http://www.onvif.org/ver10/media/wsdl">
<SOAP-ENV:Header>
.....
</SOAP-ENV:Header>
<SOAP-ENV:Body>
   <trt:GetOSDResponse>
      <trt:OSD token="osd-3">
         <tt:VideoSourceConfigurationToken>0</tt:VideoSourceConfigurationToken>
         <tt:Type>Text</tt:Type>
         <tt:Position>
            <tt:Type>LowerLeft</tt:Type>
         </tt:Position>
         <tt:TextString>
            <tt:Type>Plain</tt:Type>
            <tt:PlainText>West side gate No.01</tt:PlainText>
         </tt:TextString>
      </trt:OSD>
   </trt:GetOSDResponse>
</SOAP-ENV:Body>
</SOAP-ENV:Envelope>
```

FIG. 11B
```xml
<?xml version="1.0" encoding="UTF-8"?>
<SOAP-ENV:Envelope
xmlns:SOAP-ENV="http://www.w3.org/2003/05/soap-envelope"
xmlns:tt="http://www.onvif.org/ver10/schema"
xmlns:trt="http://www.onvif.org/ver10/media/wsdl">
<SOAP-ENV:Header>
.....
</SOAP-ENV:Header>
<SOAP-ENV:Body>
   <trt:SetOSD>
      <trt:OSD token="osd-3">
         <tt:VideoSourceConfigurationToken>0</tt:VideoSourceConfigurationToken>
         <tt:Type>Text</tt:Type>
         <tt:Position>
            <tt:Type>LowerLeft</tt:Type>
         </tt:Position>
         <tt:TextString>
            <tt:Type>Plain</tt:Type>
            <tt:PlainText>West side gate No.02</tt:PlainText>
         </tt:TextString>
      </trt:OSD>
   </trt:SetOSD>
</SOAP-ENV:Body>
</SOAP-ENV:Envelope>
```

IMAGE PICKUP APPARATUS, IMAGE PICKUP SYSTEM, METHOD FOR CONTROLLING IMAGE PICKUP APPARATUS, METHOD FOR CONTROLLING IMAGE PICKUP SYSTEM, AND PROGRAM

BACKGROUND OF THE INVENTION

Field of the Invention

The present invention relates to image pickup apparatuses, image pickup systems, methods for controlling the image pickup apparatuses, methods for controlling the image pickup systems, and programs. In particular, the present invention relates to a technique of superimposing information representing an image or the like on a captured image.

Description of the Related Art

In general, a function of superimposing superimposition information such as a certain character and a certain graphic on a certain position of an image has been widely used. For example, an On Screen Display (hereinafter referred to as "OSD" where appropriate) function or the like of displaying an OSD image in a fixed position in an image has been widely used.

Japanese Patent Laid-Open No. 9-163258 discloses visual equipment which outputs control command data for the OSD to an interface cable and visual equipment which receives the control command data output to the interface cable.

An amount of superimposition information input to an apparatus having the superimposing function may be large or small. Therefore, when an amount of superimposition information is too large, the superimposition information may not be set to the apparatus. Even if the superimposition information may be set to the apparatus, it is not necessarily the case that the entire superimposition information is superimposed on an image.

For example, a user may not set a character string of 30 characters to an apparatus which allows a setting of a character string having at most 16 characters. Even in a case where a character string of 16 characters may be set to the apparatus, if a size of an image is too small, it is not necessarily the case that all the character string having the 16 characters is superimposed on the image.

Specifically, the present invention provides an image pickup apparatus, an external apparatus, an image pickup system, a method for controlling the image pickup apparatus, a method for controlling the external apparatus, a method for controlling the image pickup system, and a program which are capable of appropriately superimposing superimposition information on an image in accordance with an amount of the superimposition information.

SUMMARY OF THE INVENTION

The present invention provides an apparatus including an image pickup unit configured to capture an image of an object, a reception unit configured to receive superimposition information from an external apparatus through a network, a determination unit configured to determine whether the received superimposition information is larger than a first amount, an output unit configured to output part of the received superimposition information when the superimposition information is larger than the first amount and output the received superimposition information when the superimposition information is not larger than the first amount, an superimposition unit configured to superimpose the output superimposition information on the captured image, and a delivery unit configured to deliver the captured image on which the superimposition information is superimposed to the external apparatus.

Furthermore, the present invention provides an apparatus including an image pickup unit configured to capture an image of an object, a reception unit configured to receive superimposition information from an external apparatus through a network, a first determination unit configured to determine whether the received superimposition information is larger than a first amount, an output unit configured to output part of the received superimposition information when the superimposition information is larger than the first amount and output the received superimposition information when the superimposition information is not larger than the first amount, a second determination unit configured to determine whether the output superimposition information is larger than a second amount, a generation unit configured to generate part of the output superimposition information when the superimposition information is larger than the second amount and generate the output superimposition information when the superimposition information is not larger than the second amount, and a superimposition unit configured to superimpose the generated superimposition information on the captured image.

Moreover, the present invention provides a system including an external apparatus and an apparatus. The external apparatus includes a transmission unit configured to transmit superimposition information to the apparatus through a network. The apparatus includes an image pickup unit configured to capture an image of an object, a determination unit configured to determine whether the transmitted superimposition information is larger than a first amount, an output unit configured to output part of the transmitted superimposition information when the superimposition information is larger than the first amount and output the transmitted superimposition information when the superimposition information is not larger than the first amount, a superimposition unit configured to superimpose the output superimposition information on the captured image, and a delivery unit configured to deliver the captured image on which the superimposition information is superimposed to the external apparatus.

Furthermore, the present invention provides a method for controlling an apparatus. The method includes capturing an image of an object, receiving superimposition information from an external apparatus through a network; determining whether the received superimposition information is larger than a first amount, outputting part of the received superimposition information when the received superimposition information is larger than the first amount and outputting the received superimposition information when the received superimposition information is not larger than the first amount, superimposing the output superimposition information on the captured image, and delivering the captured image on which the superimposition information is superimposed to the external apparatus.

Moreover, the present invention provides a method for controlling a system including an external apparatus and an apparatus. The external apparatus includes transmitting superimposition information to the apparatus through a network. The apparatus includes capturing an image of an object, determining whether the transmitted superimposition information is larger than a first amount, outputting part of the transmitted superimposition information when the transmitted superimposition information is larger than the first amount and outputting the transmitted superimposition information when the transmitted superimposition information is not larger than the first amount, superimposing the output superimposition information on the captured image, and delivering the captured image on which the superimposition information is superimposed to the external apparatus.

Furthermore, the present invention provides a program which controls an apparatus and which causes a computer to execute capturing an image of an object, receiving superimposition information from an external apparatus through a network, determining whether the received superimposition information is larger than a first amount, outputting part of the received superimposition information when the received superimposition information is larger than the first amount and outputting the received superimposition information when the received superimposition information is not larger than the first amount, superimposing the output superimposition information on the captured image, and delivering the captured image on which the superimposition information is superimposed to the external apparatus.

Moreover, the present invention provides a program that controls a system including an external apparatus and an apparatus. The program causes a computer to execute, in the external apparatus, transmitting superimposition information to the image pickup apparatus through a network, and in the apparatus, capturing an image of an object, determining whether the transmitted superimposition information is larger than a first amount, outputting part of the transmitted superimposition information when the transmitted superimposition information is larger than the first amount and outputting the transmitted superimposition information when the transmitted superimposition information is not larger than the first amount, superimposing the output superimposition information on the captured image, and delivering the captured image on which the superimposition information is superimposed to the external apparatus.

Further features of the present invention will become apparent from the following description of exemplary embodiments with reference to the attached drawings.

BRIEF DESCRIPTION OF THE DRAWINGS

FIG. 3 is a diagram illustrating a process of synthesizing a captured image and an OSD image according to the first embodiment of the present invention.

FIG. 4 is a sequence diagram illustrating a command sequence of the monitoring camera and a client apparatus according to the first embodiment of the present invention.

FIGS. 6A to 6G are diagrams illustrating definition of an OSDConfiguration type according to the first embodiment of the present invention.

FIGS. 7A to 7E are diagrams illustrating definition of an OSDConfigurationOptions type according to the first embodiment of the present invention.

FIGS. 8A to 8F are diagrams illustrating definition of an OSDColorOptions type according to the first embodiment of the present invention.

FIGS. 10A and 10B are diagrams illustrating a configuration of a CreateOSD command and a configuration of a response to the command according to the first embodiment of the present invention.

FIGS. 11A and 11B are diagrams illustrating a configuration of a response to a GetOSD command and a configuration of a SetOSD command according to the first embodiment of the present invention.

DESCRIPTION OF THE EMBODIMENTS

Hereinafter, some embodiments of the present invention will be described in detail with reference to the accompanying drawings. Configurations in the embodiments below are merely examples, and the present invention is not limited to the illustrated configurations.

First Embodiment

Hereinafter, a network configuration of a first embodiment will be described with reference to FIGS. 2A and 2B.

Figure 2A:
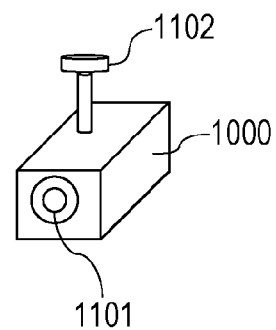
FIGS. 2A and 2B are diagrams illustrating the monitoring camera according to the first embodiment of the present invention and a system configuration of a monitoring system according to the first embodiment of the present invention, respectively.

FIG. 2A is a diagram illustrating a monitoring camera of this embodiment.

A monitoring camera 1000 illustrated in FIG. 2A includes a case 1101 including a lens and an arm mechanism 1102. The arm mechanism 1102 hangs the monitoring camera 1000 from an installation location such as a ceiling. The arm mechanism 1102 is capable of changing an image pickup direction of the monitoring camera 1000 by rotating the case 1101 in a panning direction and a tilting direction and capable of fixing the image pickup direction.

Note that the monitoring camera 1000 of this embodiment is an image pickup apparatus which shoots a moving image, and specifically, the monitoring camera 1000 is a network camera used for monitoring. Furthermore, the arm mechanism 1102 includes a stepping motor which rotates the case 1101 in the panning direction and a stepping motor which rotates the case 1101 in the tilting direction.

Figure 2B:
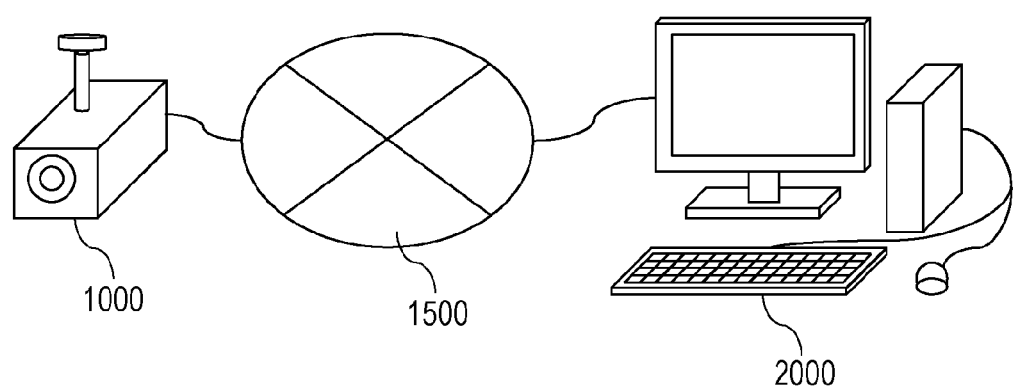

FIG. 2B is a diagram illustrating a system configuration of a monitoring system of this embodiment. In the monitoring system of this embodiment, the monitoring camera 1000 and a client apparatus 2000 are connected to each other through an IP network 1500 so as to communicate with each other. The client apparatus 2000 of this embodiment is an example of an external apparatus such as a PC. Furthermore, the monitoring system of this embodiment corresponds to an image pickup system.

The IP network 1500 is constituted by a plurality of routers, a plurality of switches, and a plurality of cables which satisfy a communication standard such as Ethernet (registered trademark). However, the IP network 1500 may have any communication standard, any size, and any configuration as long as communication between the monitoring camera 1000 and the client apparatus 2000 is enabled.

The IP network 1500 may be configured by the Internet, a wired LAN (Local Area Network), a wireless LAN, a WAN (Wide Area Network), or the like. The monitoring camera 1000 of this embodiment may support PoE (Power Over Ethernet (registered trademark)) and may receive electric power supplied thereto through a LAN cable.

The client apparatus 2000 transmits various commands to the monitoring camera 1000. Examples of the commands include a command for changing image pickup parameters which will be described below and a command for starting image streaming. The commands will be described in detail hereinafter. Furthermore, the monitoring camera 1000 transmits responses to the commands and image streaming to the client apparatus 2000.

Figure 1:
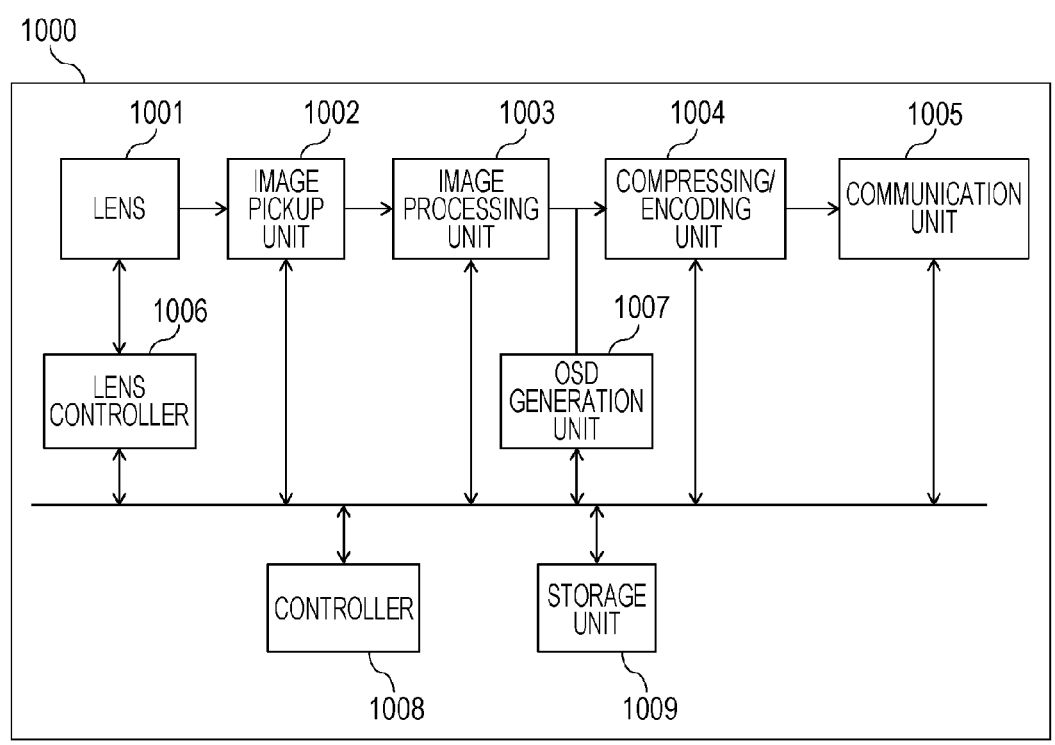
FIG. 1 is a diagram illustrating a hardware configuration of a monitoring camera according to a first embodiment of the present invention.

Next, FIG. 1 is a diagram illustrating a hardware configuration of the monitoring camera 1000 of this embodiment. In FIG. 1, a lens 1001 forms an image of an object in an image pickup unit 1002. The image pickup unit 1002 captures the image of the object formed by the lens 1001 so as to generate a captured image. Then the image pickup unit 1002 supplies the generated captured image to an image processing unit 1003.

The image processing unit 1003 performs image processing on the captured image supplied from the image pickup unit 1002 in accordance with an instruction issued by a controller 1008 described below. Thereafter, the image processing unit 1003 outputs the captured image which has been subjected to the image processing to a compressing/encoding unit 1004. The compressing/encoding unit 1004 performs compressing and encoding on the captured image supplied from the image processing unit 1003 in accordance with an instruction issued by the controller 1008.

A communication unit 1005 delivers the captured image which has been subjected to the compressing and encoding performed by the compressing/encoding unit 1004 to the client apparatus 2000 through the IP network 1500. Thereafter, the communication unit 1005 receives an OSD setting command supplied from the client apparatus 2000 through the IP network 1500. Furthermore, the communication unit 1005 receives an encoding setting command supplied from the client apparatus 2000 through the IP network 1500.

Moreover, the communication unit 1005 receives a setting command (hereinafter referred to as an "image setting command" where appropriate) for the captured image. The image setting command includes a command for setting an image size and a command for setting exposure control such as white balance and a gain for an object image. The communication unit 1005 of this embodiment corresponds to a reception unit which receives an image from the client apparatus 2000.

The lens controller 1006 changes an aperture in accordance with an image of an object and controls a focus position so as to control the lens 1001 such that focus adjustment is executed and an infrared shield filter is attached or detached. An OSD generation unit 1007 generates an OSD image in accordance with an instruction issued by the controller 1008. The OSD generation unit 1007 outputs the generated OSD image to the compressing/encoding unit 1004.

Here, the compressing/encoding unit 1004 synthesizes the captured image supplied from the image processing unit 1003 and the OSD image supplied from the OSD generation unit 1007 with each other. For example, the compressing/encoding unit 1004 superimposes the OSD image supplied from the OSD generation unit 1007 on the captured image supplied from the image processing unit 1003. Next, the compressing/encoding unit 1004 performs compressing and encoding on the synthesized captured image. Then the compressing/encoding unit 1004 supplies the captured image which has been subjected to the compressing and encoding to the communication unit 1005.

The compressing/encoding unit 1004 of this embodiment corresponds to a superimposing unit which superimposes the OSD image on the captured image output from the image pickup unit 1002. Furthermore, the OSD image of this embodiment corresponds to superimposition information.

The controller 1008 performs control of the entire monitoring camera 1000. The controller 1008 is constituted by a CPU (Central Processing Unit), for example, and executes programs stored in a storage unit 1009 described below. Alternatively, the controller 1008 may perform control using hardware.

The controller 1008 analyzes the image setting command received by the communication unit 1005. Subsequently, the controller 1008 generates image setting information in accordance with the analyzed image setting command. The controller 1008 outputs the generated image setting information to the image processing unit 1003 and simultaneously causes the storage unit 1009 to store the generated image setting information.

Note that the image processing unit 1003 performs the image processing on the captured image output from the image pickup unit 1002 in accordance with the image setting information output from the controller 1008 and outputs the captured image which has been subjected to the image processing to the compressing/encoding unit 1004.

The controller 1008 analyzes the OSD setting command received by the communication unit 1005. Subsequently, the controller 1008 generates OSD setting information in accordance with the analyzed OSD setting command. The controller 1008 outputs the generated OSD setting information to the OSD generation unit 1007 and simultaneously causes the storage unit 1009 to store the generated OSD setting information.

Note that the OSD generation unit 1007 generates an OSD image in accordance with the OSD setting information output from the controller 1008. Furthermore, the OSD setting information includes color of the OSD image and superimposition positional information. Here, the superimposition positional information represents a position where the OSD image is superimposed on the captured image output from the image processing unit 1003.

The controller 1008 analyzes the encoding setting command supplied from the communication unit 1005. Thereafter, the controller 1008 generates encoding setting information in accordance with the analyzed encoding setting command. After causing the storage unit 1009 to store the generated encoding setting information, the controller 1008 outputs the generated encoding setting information to the compressing/encoding unit 1004.

Note that the encoding setting information output from the controller 1008 includes specification information such as a data encoding method, an image size (or resolution of an image), and the like.

The compressing/encoding unit 1004 converts a size or resolution of the captured image output from the image processing unit 1003 into the size or the image resolution specified by the encoding setting information output from the controller 1008. Alternatively, the compressing/encoding unit 1004 converts an image size or image resolution of an image obtained by synthesizing the captured image output from the image processing unit 1003 and the OSD image output from the OSD generation unit 1007 with each other into the image size or the image resolution specified by the encoding setting information output from the controller 1008.

Then the compressing/encoding unit 1004 performs compressing and encoding on the converted captured image using the encoding method specified by the encoding setting information output from the controller 1008. Note that, in this embodiment, the specified encoding format includes JPEG, MPEG, H.264, and H.265.

With the operation described above, the monitoring camera 1000 of this embodiment may convert an image of a certain object into a plurality of images of the object which have different image sizes. Furthermore, the monitoring camera 1000 may perform compressing and encoding on the converted images so as to obtain a plurality of images encoded by different encoding methods. The monitoring camera 1000 substantially simultaneously delivers the images which have been subjected to the compressing and encoding as streaming delivery.

The images which are delivered as streaming delivery are externally output through the communication unit 1005.

Figure 14:
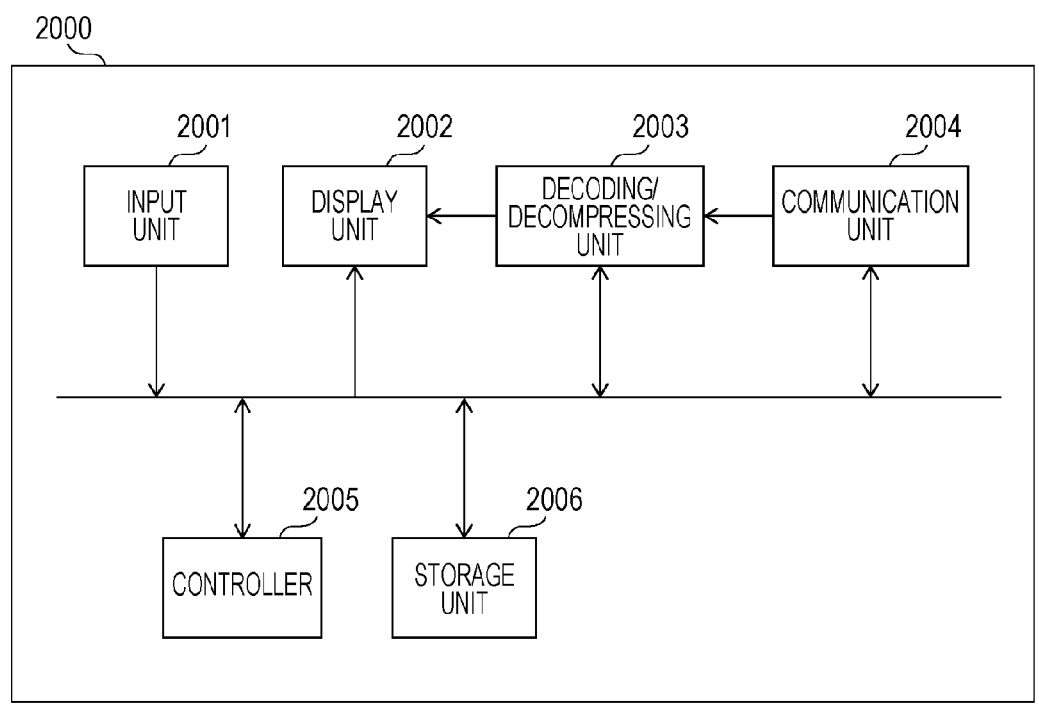
FIG. 14 is a diagram illustrating a hardware configuration of the client apparatus according to the first embodiment of the present invention.

Next, FIG. 14 is a diagram illustrating a hardware configuration of the client apparatus 2000 according to this embodiment. The client apparatus 2000 of this embodiment is configured as a computer apparatus connected to the IP network 1500.

A controller 2005 performs control of the entire client apparatus 2000. The controller 2005 is constituted by a CPU, for example, and executes programs stored in a storage unit 2006 described below. Alternatively, the controller 2005 may perform control using hardware. The storage unit 2006 is used as a region for storing programs to be executed by the controller 2005, a work region while the programs are executed, and a region for storing data.

When receiving an instruction issued by the controller 2005, a communication unit 2004 transmits a command or the like to the monitoring camera 1000. Furthermore, when receiving an instruction issued by the controller 2005, the communication unit 2004 receives a response to the command and images delivered by streaming delivery and the like.

An input unit 2001 accepts input of an instruction issued by a user. For example, the input unit 2001 may accept inputs of instructions for transmitting various commands to the monitoring camera 1000 as instructions issued by the user. Furthermore, the input unit 2001 may accept inputs of responses of the user to inquiry messages or the like to the user which are generated when the controller 2005 executes the programs stored in the storage unit 2006.

A decoding/decompressing unit 2003 decodes and decompresses an image output from the communication unit 2004. The decoding/decompressing unit 2003 outputs the decoded and decompressed image to a display unit 2002. The display unit 2002 displays the image output from the decoding/decompressing unit 2003. Furthermore, the display unit 2002 may display an inquiry message to the user generated when the controller 2005 executes a program stored in the storage unit 2006.

Next, FIG. 3 is a flowchart illustrating a process of synthesizing a captured image output from the image pickup unit 1002 and an OSD image output from the OSD generation unit 1007 with each other according to this embodiment. Note that the process illustrated in FIG. 3 is executed by the controller 1008.

In step S3001, the controller 1008 receives an OSD setting command transmitted from the client apparatus 2000 through the communication unit 1005. The controller 1008 analyzes the OSD setting command and generates OSD setting information.

In step S3002, the controller 1008 outputs the OSD setting information generated in step S3001 to the OSD generation unit 1007. Simultaneously with the output, the controller 1008 outputs image setting information set in the image processing unit 1003 to the OSD generation unit 1007.

Note that the image setting information includes information on an image size and the like.

In step S3003, the controller 1008 instructs the OSD generation unit 1007 to prepare bitmap data for an OSD image. The bitmap data is stored in a memory included in the OSD generation unit 1007.

For example, when an OSD image is text, the controller 1008 instructs the OSD generation unit 1007 to read font data of different sizes from the storage unit 1009 so that a plurality of bitmap data corresponding to an image size of a captured image are prepared. This preparation is performed to display the OSD image superimposed on the captured image in a uniform ratio relative to the captured image irrespective of an image size of the captured image.

In step S3004, the controller 1008 instructs the OSD generation unit 1007 to generate an OSD image as bitmap data. The OSD image has a color and the like specified by the OSD setting information generated in step S3001.

In step S3005, the controller 1008 instructs the OSD generation unit 1007 to output the OSD setting information to the compressing/encoding unit 1004.

The OSD setting information includes information for determining a position of synthesis of the bitmap data relative to the captured image output from the image processing unit 1003. Furthermore, the synthesis position is obtained on the basis of superimposition positional information of the OSD image specified by the OSD setting information received in step S3001 and the bitmap data generated in step S3004.

Here, the compressing/encoding unit 1004 synthesizes the captured image supplied from the image processing unit 1003 and the OSD image supplied from the OSD generation unit 1007 with each other. In the synthesis, the compressing/encoding unit 1004 reflects the OSD image and the OSD setting information output from the OSD generation unit 1007 on the image size of the captured image or resolution of the captured image.

Then the compressing/encoding unit 1004 performs compressing and encoding on the synthesized captured image using an encoding method specified by the encoding setting information output from the controller 1008. By this process, the captured image on which the OSD image is synthesized is delivered as streaming delivery to the client apparatus 2000 through the communication unit 1005.

Note that the communication unit 1005 is an example of a delivery unit which delivers the captured image synthesized with the OSD image by the compressing/encoding unit 1004 through the IP network 1500.

When the OSD image specified by the OSD setting information includes information updated every second, for example, information on time, the OSD generation unit 1007 reflects a new OSD image and new OSD setting information on the compressing/encoding unit 1004 every time the update is performed.

Here, the OSD generation unit 1007 outputs the OSD image such that a ratio of the image size to the OSD image becomes uniform wherever possible. However, it is not necessarily the case that the uniform ratio is appropriate depending on a combination between the image size and a font size included in the OSD image.

For example, in a case where the image size is small, when the font size is set small so that the image size and the font size included in the image become uniform, the text included in the OSD image may be difficult to be recognized. Therefore, a certain restriction may be made on a length of the text to be superimposed on the captured image.

Next, FIG. 4 is a diagram illustrating a typical command sequence between the monitoring camera 1000 and the client apparatus 2000 in a period from when a setting of parameters of an image which is delivered by streaming delivery is started to when the image is delivered by the streaming delivery.

Note that a transaction in this embodiment represents a pair of a command transmitted from the client apparatus 2000 to the monitoring camera 1000 and a response returned from the monitoring camera 1000 to the client apparatus 2000.

In FIG. 4, a reference numeral 6000 denotes an apparatus searching transaction. The client apparatus 2000 transmits a Probe command including a certain searching condition for searching for a monitoring camera connected to the network in a multicast manner. Among monitoring cameras which have received the Probe command, a monitoring camera which satisfies the searching condition returns a ProbeMatch command to the client apparatus 2000 which is a transmission source of the Probe command, and the searching is completed.

A reference numeral 6001 denotes a GetProfiles transaction. This transaction is used to obtain a media profile corresponding to a delivery profile. The client apparatus 2000 transmits the GetProfiles command to the monitoring camera 1000.

The monitoring camera 1000 which has received the GetProfiles command transmits a media profile list to the client apparatus 2000. By this, the client apparatus 2000 obtains the list of media profiles currently available in the monitoring camera 1000 together with delivery profile IDs for identifying the media profiles.

A reference numeral 6002 denotes a GetVideoSources transaction. This transaction is used to obtain a function of the image processing unit 1003. The client apparatus 2000 transmits a GetVideoSources command to the monitoring camera 1000. The monitoring camera 1000 which has received the GetVideoSources command transmits a response to the command to the client apparatus 2000.

By this transaction, the client apparatus 2000 obtains information on a setting of the image processing function of the monitoring camera 1000.

A reference numeral 6003 denotes a GetVideoSourceConfigurations transaction. This transaction is used to obtain an image processing setting list from the monitoring camera 1000. The client apparatus 2000 transmits a GetVideoSourceConfigurations command to the monitoring camera 1000.

The monitoring camera 1000 which has received the GetVideoSourceConfigurations command transmits a list including IDs of image processing settings stored in the monitoring camera 1000 to the client apparatus 2000 as a response. The list is an example of the image setting information generated by the controller 1008.

A reference numeral 6004 denotes a GetVideoEncoder-Configurations transaction. This transaction is used to obtain a function of the compressing/encoding unit 1004. The client apparatus 2000 transmits a GetVideoEncorderConfigurations command to the monitoring camera 1000. The monitoring camera 1000 which has received this command returns a response to the command.

By this transaction, the client apparatus 2000 obtains information on the function provided by the compressing/encoding unit 1004 of the monitoring camera 1000. The information is an example of encryption setting information generated by the controller 1008.

A reference numeral 6005 denotes a GetVideoEncoder-ConfigurationOptions transaction. This transaction is used to obtain a list of settings to the compressing/encoding unit 1004. The client apparatus 2000 transmits a GetVideoEn-corderConfigurationOptions command to the monitoring camera 1000.

The monitoring camera 1000 which has received this command returns a response to the command. By this transaction, the client apparatus 2000 obtains a list including IDs of compressing/encoding settings stored in the storage unit 1009 from the monitoring camera 1000.

A reference numeral 6006 denotes a CreateProfile transaction. This transaction is used to request creation of a delivery profile. The client apparatus 2000 transmits a CreateProfile command to the monitoring camera 1000. The monitoring camera 1000 which has received this command returns a response to the command.

By this transaction, the client apparatus 2000 newly generates a delivery profile in the monitoring camera 1000 and obtains an ID of the created delivery profile. The monitoring camera 1000 stores the newly created delivery profile.

A reference numeral 6007 denotes an AddVideoSource-Configuration transaction. This transaction is used to request addition of an image processing setting. The client apparatus 2000 transmits an AddVideoSourceConfiguration command to the monitoring camera 1000.

The monitoring camera 1000 which has received this command transmits a response to the command to the client apparatus 2000. By this transaction, the client apparatus 2000 specifies the delivery profile ID obtained in 6006 and the ID of the image processing setting obtained in 6003. The monitoring camera 1000 stores the image processing setting specified by the specified delivery profile such that the image processing setting is associated with the delivery profile.

Note that the command denoted by 6007 is an example of the image setting command described above.

A reference numeral 6008 denotes an AddVideoEncoder-Configuration transaction. This transaction is used to request addition of a compressing/encoding setting. The client apparatus 2000 transmits an AddVideoEncoderConfiguration command to the monitoring camera 1000. The monitoring camera 1000 transmits a response to the command to the client apparatus 2000.

By this transaction, the client apparatus 2000 specifies the delivery profile ID obtained in 6006 and the ID of the compressing/encoding setting obtained in 6004 and associates the compressing/encoding setting with the delivery profile. The monitoring camera 1000 stores the compressing/encoding setting specified by the specified delivery profile such that the compressing/encoding setting is associated with the delivery profile.

A reference numeral 6009 denotes a SetVideoEncoder-Configuration transaction. This transaction is used to change the compressing/encoding setting. The client apparatus 2000 transmits a SetVideoEncoderConfiguration command to the monitoring camera 1000.

The monitoring camera 1000 which has received this command returns a response to the command. By this transaction, the client apparatus 2000 changes content of the compressing/encoding setting obtained in 6004 in accordance with options obtained in 6005. For example, the client apparatus 2000 changes a compressing/encoding method and an extraction size. The monitoring camera 1000 stores content of the changed compressing/encoding setting.

Note that the command denoted by 6008 and the command denoted by 6009 are examples of the encryption setting command described above.

A reference numeral 6010 denotes a GetStreamUri transaction. This transaction is used to request obtainment of a delivery address. By this transaction, the client apparatus 2000 specifies the delivery profile ID obtained in 6006 and obtains a delivery address used to obtain a video image delivered in accordance with the specified delivery profile setting.

The monitoring camera 1000 transmits an image processing setting associated with the specified profile ID and a delivery address used to deliver an image corresponding to content of the compressing/encoding setting to the client apparatus 2000 as a response.

A reference numeral 6011 denotes a DESCRIBE transaction. This transaction is used to request obtainment of delivery information. The client apparatus 2000 transmits a DESCRIBE command to the monitoring camera 1000. The monitoring camera 1000 which has received this command transmits a response to the command to the client apparatus 2000.

By this transaction, the client apparatus 2000 specifies the delivery address obtained in 6010 and obtains detailed data associated with delivery information of the monitoring camera 1000.

A reference numeral 6012 denotes a SETUP transaction. This transaction is used to request a delivery setting. The client apparatus 2000 transmits a SETUP command to the monitoring camera 1000. The monitoring camera 1000 which has received this command transmits a response to the command to the client apparatus 2000.

By this transaction, the client apparatus 2000 causes the monitoring camera 1000 to prepare streaming in accordance with the detailed data associated with the delivery information obtained in 6011. By executing the command, a method for transmitting a stream including a session number is shared by the client apparatus 2000 and the monitoring camera 1000.

A reference numeral 6013 denotes a PLAY transaction. This transaction is used to start delivery. The client apparatus 2000 transmits a PLAY command to the monitoring camera 1000. The monitoring camera 1000 which has received this command transmits a response to the command to the client apparatus 2000.

When transmitting the PLAY command to the monitoring camera 1000, the client apparatus 2000 uses the session number obtained in 6012 so that an image streaming is started in accordance with the setting of the delivery profile specified in the monitoring camera 1000.

A reference numeral 6014 is a stream to be delivered from the monitoring camera 1000 to the client apparatus 2000. The stream which is requested to be started in 6013 is delivered by the transmission method shared in 6012.

A reference numeral 6015 denotes a TEARDOWN transaction. This transaction is used to stop delivery. The client apparatus 2000 transmits a TEARDOWN command to the monitoring camera 1000. The monitoring camera 1000 which has received this command returns a response to the command.

In this transaction, the client apparatus 2000 specifies the session number obtained in 6012 so as to stop the streaming being delivered.

Figure 5:
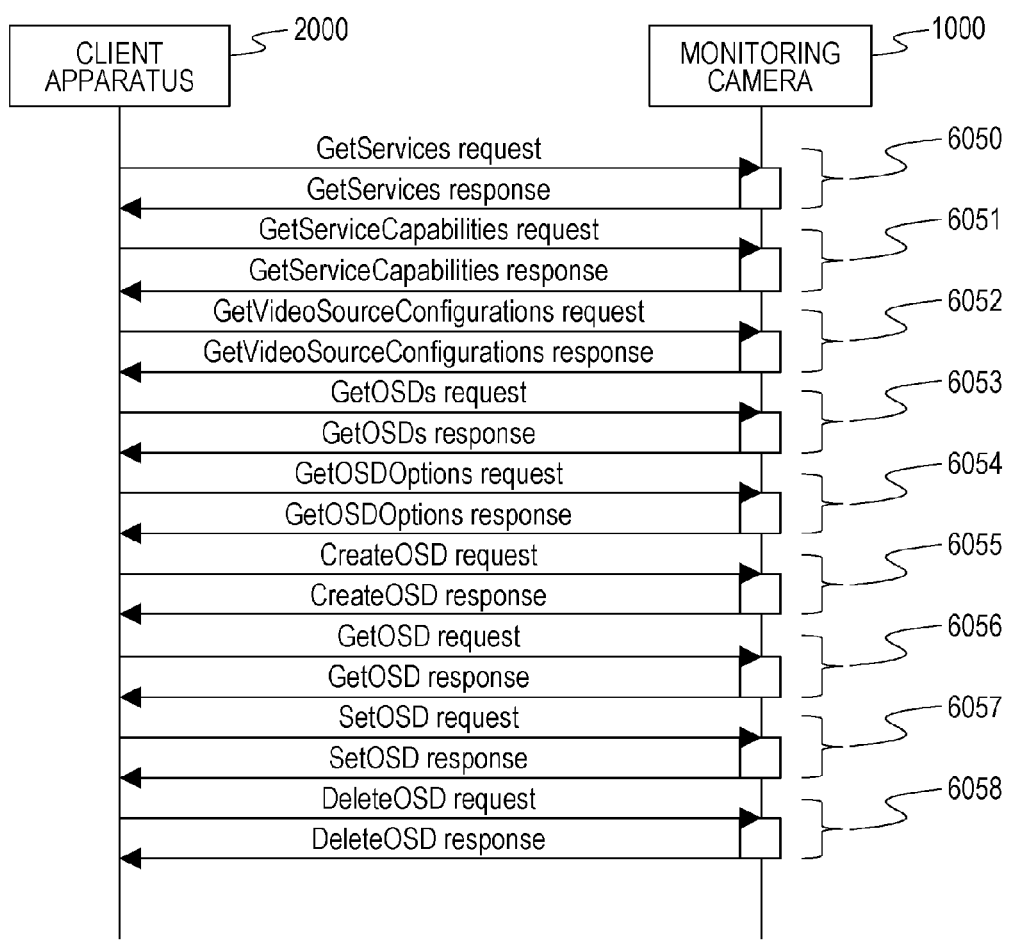
FIG. 5 is a sequence diagram illustrating a command sequence of the monitoring camera and the client apparatus according to the first embodiment of the present invention.

Next, FIG. 5 is a diagram illustrating a typical command sequence between the monitoring camera 1000 and the client apparatus 2000 for setting an image superimposition process and the like.

In FIG. 5, a reference numeral 6050 denotes a GetServices transaction. This transaction is used to request obtainment of functions of the monitoring camera 1000. The client apparatus 2000 transmits a GetServices command to the monitoring camera 1000. The monitoring camera 1000 which has received this command returns a response to the command.

By this transaction, the client apparatus 2000 obtains a list of functions of the monitoring camera 1000. The client apparatus 2000 checks whether the monitoring camera 1000 supports an image processing function and a compressing/encoding function.

A reference numeral 6051 denotes a GetServiceCapabilities transaction. This transaction is used to request obtainment of a function for the image superimposition process. The client apparatus 2000 transmits a GetServiceCapabilities command to the monitoring camera 1000. The monitoring camera 1000 which has received this command returns a response to the command.

By this transaction, the client apparatus 2000 checks whether the monitoring camera 1000 supports the image superimposition process. For example, the controller 2005 receives superimposition available information representing whether the monitoring camera 1000 may perform the image superimposition process from the monitoring camera 1000 through the communication unit 2004.

A reference numeral 6052 denotes a GetVideoSourceConfigurations transaction. This transaction is used to obtain a list of image processing settings. The client apparatus 2000 transmits a GetVideoSourceConfigurations command to the monitoring camera 1000.

The monitoring camera 1000 which has received this command transmits a response to the command to the client apparatus 2000. By this transaction, the client apparatus 2000 obtains a list including IDs of the image processing settings stored in the monitoring camera 1000 from the monitoring camera 1000. The list is an example of the image setting information generated by the controller 1008.

A reference numeral 6053 denotes a GetOSDs transaction. This transaction is used to request obtainment of an image superimposition setting list. The client apparatus 2000 transmits a GetOSDs command to the monitoring camera 1000. The monitoring camera 1000 which has received this command transmits a response to the command to the client apparatus 2000.

By this transaction, the client apparatus 2000 specifies IDs of the image superimposition settings obtained in 6052. By this, the client apparatus 2000 obtains a list of all the image superimposition settings including OSDToken which is an ID of an image superimposition setting associated with the image processing settings stored in the monitoring camera 1000.

A reference numeral 6054 denotes a GetOSDOptions transaction. This transaction is used to obtain options of the image superimposition settings. The client apparatus 2000 transmits a GetOSDOptions command to the monitoring camera 1000. The monitoring camera 1000 which has received this command transmits a response to the command to the client apparatus 2000.

By this transaction, the client apparatus 2000 specifies IDs of the image processing settings obtained in 6052. By this, the client apparatus 2000 obtains a range of options and setting values settable to parameters of the image superimposition settings associated with the image processing settings stored in the monitoring camera 1000.

A reference numeral 6055 denotes a CreateOSD transaction. This transaction is used to create a setting of image superimposition. The client apparatus 2000 transmits a CreateOSD command to the monitoring camera 1000. The monitoring camera 1000 which has received this command transmits a response to the command to the client apparatus 2000.

By this transaction, the client apparatus 2000 may create a new image superimposition setting in the monitoring camera 1000 in accordance with the options obtained in 6054. The monitoring camera 1000 returns OSDToken representing an image superimposition setting ID in accordance with the image superimposition setting specified by the client apparatus 2000.

A reference numeral 6056 denotes a GetOSD transaction. This transaction is used to request obtainment of an image superimposition setting. The client apparatus 2000 transmits a GetOSD command to the monitoring camera 1000. The monitoring camera 1000 which has received this command transmits a response to the command to the client apparatus 2000.

By this transaction, the client apparatus 2000 obtains an image superimposition setting using the OSDToken representing the image superimposition setting ID obtained in 6055. The response in 6053 and the response in 6056 are examples of the OSD setting information generated by the controller 1008.

A reference numeral 6057 denotes a SetOSD transaction. This transaction is used to change an image superimposition setting. The client apparatus 2000 transmits a SetOSD command to the monitoring camera 1000. The monitoring camera 1000 which has received this command transmits a response to the command to the client apparatus 2000.

By this transaction, the client apparatus 2000 specifies OSDToken representing the image superimposition setting ID. By this transaction, the client apparatus 2000 may change content of the image superimposition setting obtained in 6056 and content of the image superimposition setting newly created in 6055 in accordance with the options obtained in 6054.
For example, the client apparatus 2000 changes the superimposition position and content of the superimposition text.

Note that the response in 6057 does not include OSDToken.
Furthermore, the commands denoted by 6055 and 6057 are examples of the OSD setting command described above.

A reference numeral 6058 denotes a DeleteOSD transaction. This transaction is used to delete an image superimposition setting. The client apparatus 2000 transmits a DeleteOSD command to the monitoring camera 1000. The monitoring camera 1000 which has received this command transmits a response to the command to the client apparatus 2000.

By this transaction, the client apparatus 2000 deletes the image superimposition settings obtained in 6053 and 6056 and the image superimposition setting newly created in 6055 from the monitoring camera 1000. The monitoring camera 1000 deletes an image superimposition setting having OSDToken which is the specified image superimposition setting ID.

Next, FIGS. 6A to 6G are diagrams illustrating configurations of OSDConfiguration which is a data type of this embodiment. The data type illustrated in FIGS. 6A to 6G are defined using an XML Schema Definition language (hereinafter referred to as "XSD" where appropriate), for example.

FIG. 6A is a diagram illustrating definition of an OSDConfiguration type. As illustrated in FIG. 6A, the OSDConfiguration type is defined as a complex type by declaration of complexType of XML. Furthermore, the OSDConfiguration type is an extension type obtained by extending a DeviceEntity type according to a complexContent element, an extension element, and a base attribute thereof.

In the OSDConfiguration type, data extension is performed such that sequence elements appear in a defined order according to the sequence elements.

FIG. 6B is a diagram illustrating definition of an OSDReference type. In data of the OSDReference type, it is recognized that the OSDReference type is an extension type obtained by extending a ReferenceToken type according to a simpleContent element, an extension element, and a base attribute thereof.

FIG. 6C is a diagram illustrating definition of an OSDType type. In the example of the definition of the OSDType type, it is recognized that the OSDType type is a simple type of XML according to a simpleType element and is a value restriction type of a string type according to a restriction element and a base attribute thereof. According to the example of FIG. 6C, the OSDType type has a value of Text, Image, or Extended.

FIG. 6D a diagram illustrating definition of OSDPosConfiguration type. In the example of the definition of the OSDPosConfiguration type, it is recognized that the OSDPosConfiguration type is defined as a complex type according to a complexType element. Furthermore, the OSDPosConfiguration type is a data type in which sequence elements appear in a defined order according to the sequence elements.

FIG. 6E is a diagram illustrating definition of an OSDTextConfiguration type. In the example of the definition of the OSDTextConfiguration type, it is recognized that the OSDTextConfiguration type is defined as a complex type according to a complexType element. Furthermore, the OSDTextConfiguration type is a data type in which sequence elements appear in a defined order according to the sequence elements.

FIG. 6F is a diagram illustrating an OSDImgConfiguration type. In an example of the definition of the OSDImgConfiguration type, it is recognized that the OSDImgConfiguration type is defined as a complex type according to a complexType element. Furthermore, the OSDImgConfiguration type is a data type in which sequence elements appear in a defined order according to the sequence elements.

FIG. 6G is a diagram illustrating definition of an OSDConfigurationExtension type. In an example of the definition of the OSDConfigurationExtension type, it is recognized that the OSDConfigurationExtension type is defined as a complex type according to a complexType element. Furthermore, the OSDConfigurationExtension type is a data type in which sequence elements appear in a defined order according to the sequence elements.

Next, FIGS. 7A to 7E and FIGS. 8A to 8F are diagrams illustrating a configuration of an OSDConfigurationOptions type which is a data type of this embodiment. Note that, as with the case of FIGS. 6A to 6G, data types illustrated in FIGS. 7A to 7E and FIGS. 8A to 8F are defined using XSD.

FIG. 7A is a diagram illustrating definition of an OSDConfigurationOptions type. In an example of the definition of the OSDConfigurationOptions type, it is recognized that the OSDConfigurationOptions type is defined as a complex type according to a complexType element. Furthermore, the OSDConfigurationOptions type is a data type in which sequence elements appear in a defined order according to the sequence elements.

In the OSDConfigurationOptions type, a first field corresponds to MaximumNumberOfOSDs of an int type. A second field corresponds to Type of an OSDType type. A third field corresponds to PositionOption of a string type. A fourth field corresponds to TextOption of an OSDTextOptions type.

A fifth field corresponds to ImageOption of an OSDImageOptions type. A sixth field, that is, the last field, corresponds to Extension of an OSDConfigurationOptionsExtension type.

A plurality of fields of Type described above and a plurality of fields of PositionOption described above may be included in the OSDCOnfigurationOptions type according to a specifier of maxOccurs="unbounded". Furthermore, TextOption, ImageOption, and Extension may be omitted according to a specifier of minOccurs="0".

FIG. 7B is a diagram illustrating definition of an OSDTextOptions type. In the OSDTextOptions type, it is recognized that the OSDTextOptions type is defined as a complex type according to a complexType element. Furthermore, the OSDTextOptions type is a data type in which sequence elements appear in a defined order according to the sequence elements.

In the OSDTextOptions type, a first field corresponds to a Type field of a string type. A second field corresponds to a FontSizeRange type of an IntRange type. A third field corresponds to DateFormat field of a string type. A fourth field similarly corresponds to a TimeFormat field of a string type. A fifth field corresponds to a FontColor field of an OSDColorOptions type.

Furthermore, a sixth field similarly corresponds to a BackgroundColor field of an OSDColorOptions type. A seventh field, that is, the last field, corresponds to an Extension field of an OSDTextOptionsExtension type.

A plurality of Type fields described above, a plurality of DateFormat fields described above, and a plurality of TimeFormat fields described above may be included in the OSDTextOptions type according to a specifier of maxOccurs="unbounded".

Furthermore, the FontSizeRange field, the DateFormat field, the TimeFormat field, and the FontColor field may be omitted according to a specifier of minOccurs="0". Similarly, the BackgroundColor field and the Extension field may be omitted according to the specifier of minOccurs="0"

FIG. 7C is a diagram illustrating definition of an OSDImgOptions type. In the OSDImgOptions type, it is recognized that the OSDImgOptions type is defined as a complex type according to a complexType element. Furthermore, the OSDImgOptions type is a data type in which sequence elements appear in a defined order according to the sequence elements.

In the OSDImgOptions type, a first field corresponds to an ImagePath field of an anyURI type. A second field corresponds to an Extension field of an OSDImgOptionsExtension type. A plurality of ImagePath fields may be included in the OSDImgOptions type according to a specifier of maxOccurs="unbounded".

Note that, the Extension field may be omitted according to a specifier of minOccurs="0".

FIG. 7D is a diagram illustrating definition of an OSDConfigurationOptionsExtension type. In an example of the definition of the OSDConfigurationOptionsExtension type, the OSDConfigurationOptionsExtension type is defined as a complex type according to a complexType element. Furthermore, the OSDConfigurationOptionsExtension type is a data type in which sequence elements appear in a defined order according to the sequence elements.

FIG. 7E is a diagram illustrating definition of an IntRange type.

In the IntRange type, it is recognized that the IntRange type is defined as a complex type according to a complexType element. Furthermore, the IntRange type is a data type in which sequence elements appear in a defined order according to the sequence elements.

In the IntRange type, a first field corresponds to a Min field of an int type and a second field, that is, the last field, corresponds to a Max field of the int type.

FIG. 8A is a diagram illustrating definition of an OSDColorOptions type. In the OSDColorOptions type, it is recognized that the OSDColorOptions type is defined as a complex type according to a complexType element. Furthermore, the OSDColorOptions type is a data type in which sequence elements appear in a defined order according to the sequence elements.

Furthermore, a Color field, a Transparent field, and an Extension field may be omitted according to a specifier of minOccurs="0".

FIG. 8B is a diagram illustrating definition of an OSDTextOptionsExtension type. In the OSDTextOptionsExtension type, it is recognized that the OSDTextOptionsExtension type is defined as a complex type according to a complexType element. Furthermore, the OSDTextOptionsExtension type is a data type in which sequence elements appear in a defined order according to the sequence elements.

FIG. 8C is a diagram illustrating definition of a ColorOptions type. In the ColorOptions type, it is recognized that the ColorOptions type is defined as a complex type according to a complexType element. Furthermore, the ColorOptions type is a data type in which sequence elements appear in a defined order according to the sequence elements. Moreover, according to choice elements included in the sequence element, one of the choice elements is selected.

Specifically, in the ColorOptions type, one of a ColorList field and a ColorspaceRange field described below is selected. As described above, The ColorOptions type includes the ColorList field of a Color type as one of options. The ColorOptions type further includes the ColorspaceRange field of a ColorspaceRange type as the other of the options.

A plurality of ColorList fields described above and a plurality of ColorspaceRange fields described above may be included in the ColorOptions type according to a specifier of maxOccurs="unbounded".

FIG. 8D is a diagram illustrating definition of a Color type. In the Color type, attributes X, Y, and Z of a float type may be described according to attribute elements. Furthermore, the attributes X, Y, and Z are components in the Color type according to a specifier of use="required". In the Color type, an attribute Colorspace of the anyURI type may be described according to one of the attribute elements.

FIG. 8E is a diagram illustrating definition of a ColorspaceRange type. In the ColorspaceRange type, it is recognized that the ColorspaceRange type is defined as a complex type according to a complexType element. It is further recognized that the ColorspaceRange type is a data type in which sequence elements appear in a defined order according to the sequence elements.

A first field of the ColorspaceRange type corresponds to an X field, a second field corresponds to a Y field, and a third field corresponds to a Z field. The X, Y, and Z fields are data of a FloatRange type. A fourth field, that is, the last field, of the ColorspaceRange type corresponds to a Colorspace field of the anyURI type.

FIG. 8F is a diagram illustrating definition of a FloatRange type. In the definition of the FloatRange type, it is recognized that the FloatRange type is defined as a complex type according to a complexType element. Furthermore, the FloatRange type is a data type in which sequence elements appear in a defined order according to the sequence elements.

In the FloatRange type, a first field corresponds to a Min field of a float type and a second field, that is, the last field, corresponds to a Max field of the float type.

According to this embodiment, the client apparatus 2000 obtains information on the OSD settable to the image pickup apparatus of this embodiment from the image pickup apparatus using the data of the OSDConfigurationOptions type. Furthermore, the monitoring camera 1000 of this embodiment uses the data of the OSDConfigurationOptions type described above so as to transmit capability information associated with the OSD of the monitoring camera 1000.

Figure 9A:
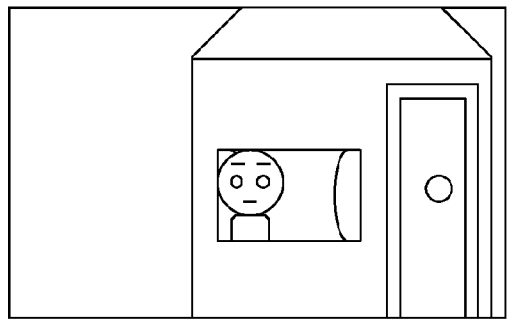
FIGS. 9A to 9F are diagrams illustrating images obtained by synthesizing a captured image and an OSD image according to the first embodiment of the present invention.

Next, FIGS. 9A to 9F are diagrams illustrating images obtained by synthesizing the captured image output from the image pickup unit 1003 and the OSD image output from the OSD generation unit 1007 with each other according to this embodiment. First, FIG. 9A is a diagram illustrating the captured image output from the image processing unit 1003. The OSD image output from the OSD generation unit 1007 is not synthesized with the captured image of this example.

Figure 9B:
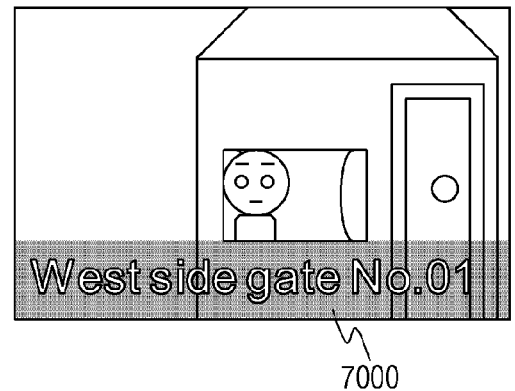

First, FIG. 9B is a diagram illustrating the captured image output from the image processing unit 1003. An OSD image 7000 output from the OSD generation unit 1007 is superimposed on the captured image of this example. The OSD image 7000 includes a character string "West side gate No. 01". The client apparatus 2000 sets this character string by transmitting a CreateOSD command.

The CreateOSD command will now be described below with reference to FIG. 10A. FIGS. 9C to 9F will be described later.

FIG. 10A is a diagram illustrating the CreateOSD command used to create an image superimposition setting. This command is an example of the command in 6055. Specifically, the CreateOSD command is issued to create an image superimposition setting for the OSD image 7000 illustrated in FIG. 9B. In FIG. 10A, a value of OSDToken which is an ID for identifying an image superimposition setting is "osd-3".

VideoSourceConfigurationToken which is associated with OSDToken is an ID for identifying an image processing setting. A value of the ID is "0". Furthermore, OSDToken is associated with Type of the OSDType type. A value of Type is "Text" which represents that the OSD image is a character string.

Furthermore, OSDToken is associated with Position used to represent a superimposing position of the OSD image. A value of Type associated with Position is "LowerLeft" which represents that the superimposing position of the OSD image is a lower left position. Furthermore, TextString used to represent information on a setting of the character string of the OSD image is associated with OSDToken.

Type representing a type of the OSD image is associated with TextString, and a value of Type is "Plain" which represents that the OSD image is an arbitrary character string. Furthermore, PlainText is associated with TextString. A value of PlainText is "West side gate No. 01".

The value represents content of PlainText (text of the OSD image). In this specification, the value is referred to as an "input character string" where appropriate.

FIG. 10B is a diagram illustrating a configuration of parameters of a response (that is, CreateOSDResponse) to the CreateOSD command illustrated in FIG. 10A. The response is an example of the response in 6055. In FIG. 10B, a value of OSDToken is "osd-3" which represents that creation of an image superimposition setting is successfully performed.

Figure 12:
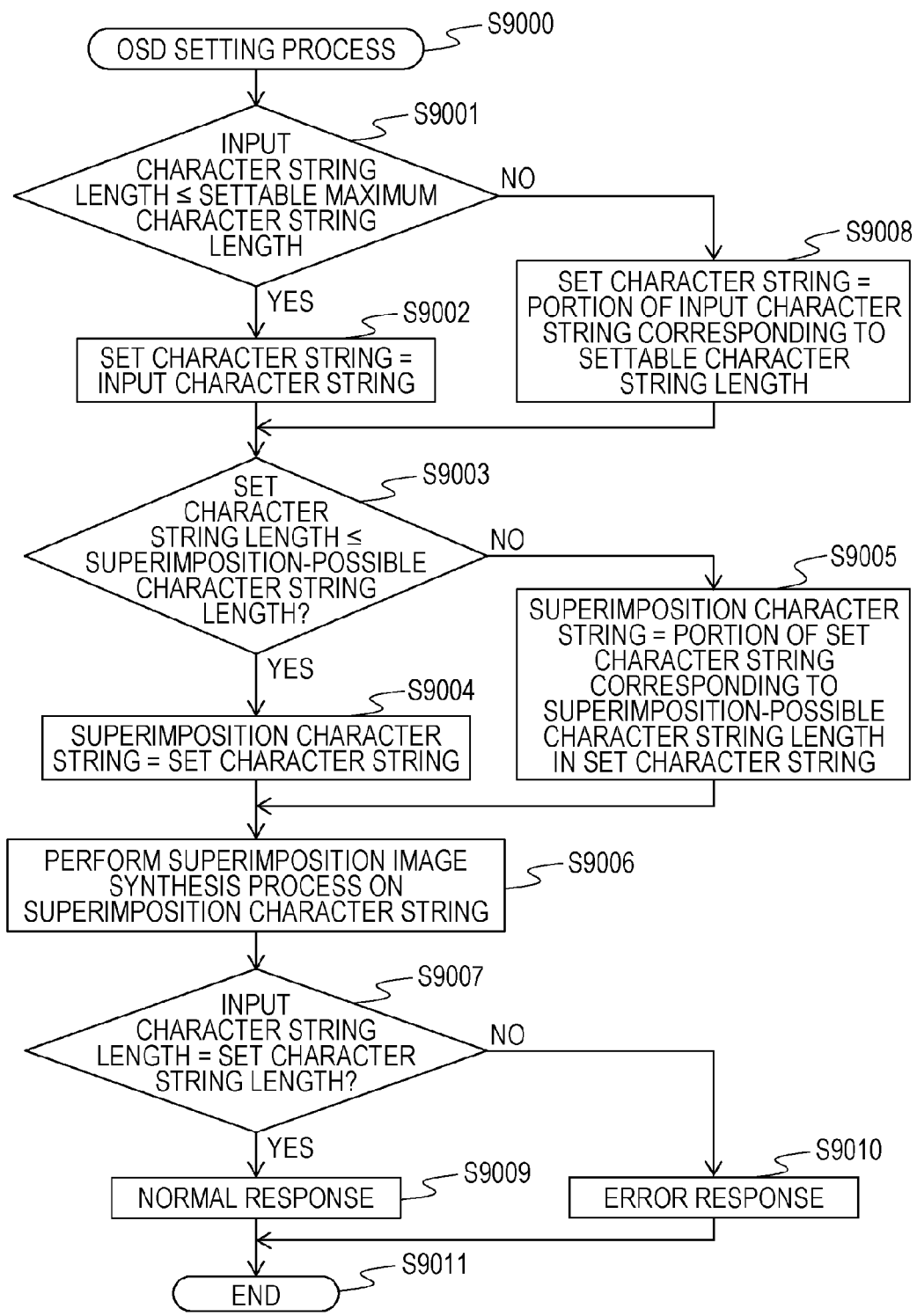
FIG. 12 is a flowchart illustrating a superimposition image setting process according to the first embodiment of the present invention.

Next, FIG. 12 is a flowchart illustrating an image superimposition setting process (hereinafter referred to as an OSD setting process where appropriate) performed by the monitoring camera 1000. This process is executed by the controller 1008. Furthermore, this process is started by the controller 1008 when the monitoring camera 1000 receives the CreateOSD command from the client apparatus 2000.

The received CreateOSD command is stored in the storage unit 1009.

In step S9000, the controller 1008 starts an OSD setting process. The controller 1008 determines whether a CreateOSD command has been received through the communication unit 1005, for example.

When the controller 1008 determines that a CreateOSD command has been received through the communication unit 1005, the process proceeds to step S9001. When the controller 1008 determines that a CreateOSD command has not been received through the communication unit 1005, the process does not proceed to step S9001.

In step S9001, the controller 1008 determines whether an "input character string length" is equal to or smaller than a "settable maximum character string length". Here, the "input character string length" in this embodiment represents the number of characters included in an "input character string", for example. The "settable maximum character string length" in this embodiment represents the number of characters included in a "settable maximum character string", for example.

When the controller 1008 determines that the "input character string length" is equal to or smaller than the "settable maximum character string length", the process proceeds to step S9002. On the other hand, when the controller 1008 determines that the "input character string length" is not equal to or smaller than the "settable maximum character string length", the process proceeds to step S9008.

Note that the controller 1008 obtains the "settable maximum character string length" as follows. First, the controller 1008 reads all sizes of images which may be generated by the compressing/encoding unit 1004 from the storage unit 1009. Thereafter, the controller 1008 reads "settable character string lengths" corresponding to all the read image sizes from the storage unit 1009.

The "settable character string lengths" in this embodiment represent the numbers of characters included in "settable character strings" corresponding to the image sizes, for example.

Then the controller 1008 stores the longest one of the read "settable character string lengths" in the storage unit 1009 as the "settable maximum character string length". The "settable character string lengths" are determined by restriction of hardware. Examples of the restriction of hardware include insufficient memory and a range of a region in which the OSD image is to be superimposed included in the captured image.

Furthermore, the controller 1008 obtains the "input character string length" as follows. First, the controller 1008 reads a character string (an input character string) described in association with PlainText in the CreateOSD command received through the communication unit 1005 from the storage unit 1009. Next, the controller 1008 stores a length of the read character string in the storage unit 1009 as an "input character string length".

By this, the controller 1008 serves as a determination unit which determines whether the character string described in association with PlainText in the CreateOSD command received through the communication unit 1005 is equal to or smaller than the "settable maximum character string length".

In step S9002, the controller 1008 stores the input character string in the storage unit 1009 as a "set character string". For example, the controller 1008 serves as an output unit which outputs the input character string read in step S9001 to the storage unit 1009 so as to cause the storage unit 1009 to store the input character string which has been output as the "set character string".

In step S9003, the controller 1008 determines whether a "set character string length" which is a length of the "set character string" stored in the storage unit 1009 in step S9002 or step S9008 is equal to or smaller than a "superimposition-possible character string length". Here, the "superimposition-possible character string length" in this embodiment represents the number of characters included in a "superimposition-possible character string" which represents a character string which may be superimposed and which is output from the image processing unit 1003, for example.

When the controller 1008 determines that the "set character string length" is equal to or smaller than the "superimposition-possible character string length", the process proceeds to step S9004. On the other hand, when the controller 1008 determines that the "set character string length" is not equal to or smaller than the "superimposition-possible character string length", the process proceeds to step S9005.

Note that the controller 1008 obtains the "superimposition-possible character string length" as follows. First, the controller 1008 obtains a size of an image currently generated by the compressing/encoding unit 1004. Subsequently, the controller 1008 sets one of the "settable character string lengths" read in step S9001 which corresponds to the obtained image size as the "superimposition-possible character string length".

In step S9004, the controller 1008 stores the "set character string" stored in the storage unit 1009 in step S9002 or step S9008 in the storage unit 1009 as a "superimposition character string".

In step S9005, the controller 1008 stores a portion of the "set character string" stored in the storage unit 1009 in step S9002 or step S9008 corresponding to the "superimposition-possible character string length" in the storage unit 1009 as the "superimposition character string".

It is assumed that the "superimposition-possible character string length" obtained in step S9003 corresponds to 12 characters. In this case, the controller 1008 stores first to twelfth characters in the "set character string" stored in the storage unit 1009 in step S902 or step S9008 in the storage unit 1009 as the "superimposition character string".

In step S9006, the controller 1008 instructs the compressing/encoding unit 1004 and the OSD generation unit 1007 to superimpose the character string corresponding to the "superimposition character string" on the captured image output from the image processing unit 1003. The "superimposition character string" has been stored in the storage unit 1009 in step S9004 or step S9005.

In step S9007, the controller 1008 determines whether the "set character string length" obtained in step S9003 matches the "input character string length" obtained in step S9001.

When the controller 1008 determines that the "set character string length" obtained in step S9003 matches the "input character string length" obtained in step S9001, the process proceeds to step S9009. On the other hand, when the controller 1008 determines that the "set character string length" obtained in step S9003 does not match the "input character string length" obtained in step S9001, the process proceeds to step S9010.

In step S9008, the controller 1008 stores a portion of the "input character string" obtained in step S9001 corresponding to the "settable maximum character string length" in the storage unit 1009 as a "set character string".

In step S9009, the controller 1008 transmits a response representing a normal operation to the client apparatus 2000 through the communication unit 1005.

In step S9010, the controller 1008 transmits a response representing an error to the client apparatus 2000 through the communication unit 1005.

In this embodiment, the "set character string" and the "superimposition character string" are obtained from the "input character string" obtained in step S9001. This is because it is not necessarily the case that (a length of) the "set character string" settable to the monitoring camera 1000 coincides with (a length of) the "superimposition character string" output from the image processing unit 1003.

For example, the length of the "set character string" is restricted by a region used to store character strings in the storage unit 1009. On the other hand, the length of the "superimposition character string" is restricted by a determination as to whether the "superimposition character string" may be accommodated in the captured image output from the image processing unit 1003.

Subsequently, FIG. 11A is a diagram illustrating the GetOSD response. The response is an example of the response in 6056. An image superimposition setting corresponding to the response is generated by the CreateOSD command illustrated in FIG. 10A. In FIG. 11A, a value of OSDToken which is an ID for identifying the image superimposition setting of the OSD image is "osd-3".

VideoSourceConfigurationToken associated with OSDToken is an ID for identifying an image processing setting. A value of the ID is "0". Furthermore, OSDToken is associated with Type of an OSDType type. A value of Type is "Text". This represents that the OSD image is a character string.

Furthermore, OSDToken is associated with Position used to represent a superimposing position of the OSD image. A value of Type associated with Position is "LowerLeft". Furthermore, TextString used to represent information on a setting of the character string of the OSD image is associated with OSDToken.

Type representing a type of the OSD image is associated with TextString. A value of Type is "Plain". This represents that the OSD image is an arbitrary character string. Furthermore, PlainText is associated with TextString. A value of PlainText is "West side gate No. 01".

Figure 9C:
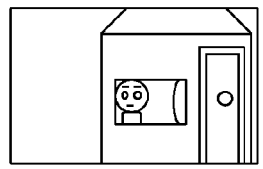

Next, FIGS. 9C to 9F are diagrams illustrating images obtained by synthesizing the captured image output from the image processing unit 1003 with the OSD image output from the OSD generation unit 1007 according to this embodiment. First, FIG. 9C is a diagram illustrating an image compressed to a quarter of the image of FIG. 9A by the compressing/encoding unit 1004.

Figure 9D:
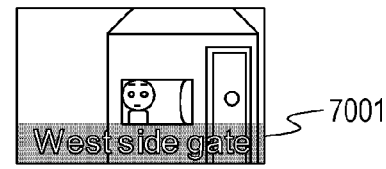

FIG. 9D is a diagram illustrating an image compressed to a quarter of the image of FIG. 9B by the compressing/encoding unit 1004 after the image superimposition setting is generated by the CreateOSD command illustrated in FIG. 10A. The image of FIG. 9D is obtained by superimposing an OSD image 7001 on the image of FIG. 9C.

As described above, the OSD generation unit 1007 intends to output the OSD image such that a ratio of an image size to a font size of the OSD image becomes uniform wherever possible. However, in a case where the font size is set small so that the image size of FIG. 9D and the font size of the OSD image become uniform, the text included in the OSD image becomes small and is difficult to be realized.

Therefore, a length of the text included in the OSD image 7001 superimposed on the image of FIG. 9D is restricted. Specifically, the text included in the OSD image 7001 is "West side gate".

It is assumed that the client apparatus 2000 transmits the GetOSD command to the monitoring camera 1000 which is delivering the image of FIG. 9D as streaming delivery. The monitoring camera 1000 which has received the command transmits the GetOSD response to the client apparatus 2000 with reference to the "set character string" in the image superimposition setting stored in the storage unit 1009.

Accordingly, a character string described in association with PlainText in the response is "West side gate No. 01". Specifically, the monitoring camera 1000 may transmit a response including the character string "West side gate No. 01" described therein even when the text included in the OSD image 7001 superimposed on the image of FIG. 9D is "West side gate".

This is because the "set character string" and the "superimposition character string" are separately stored in the storage unit 1009. Here, it is assumed that the "set character string" and the "superimposition character string" are not separately stored in the storage unit 1009. In this case, when a length of the "superimposition character string" becomes shorter than a length of the "input character string", that is, the "superimposition character string" represents "West side gate", a length of the "set character string" also becomes short, that is, the "set character string" represents "West side gate".

Figure 9E:
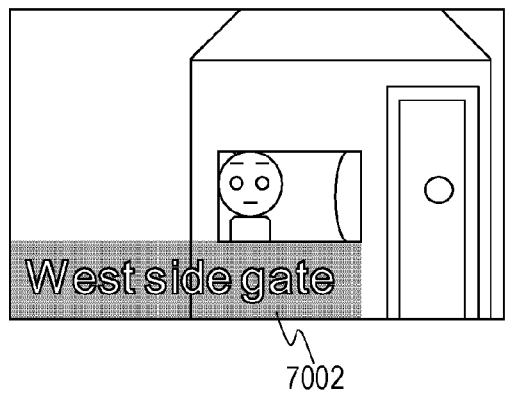

Even when a size of the image illustrated in FIG. 9D to be subjected to the streaming delivery by the monitoring camera 1000 returns to the size of the image illustrated in FIG. 9A in this state, a length of the "set character string" in the image superimposition setting is still short. Therefore, there arises a situation in that an OSD image 7002 having the short superimposition character string is displayed on the image to be subjected to the streaming delivery by the monitoring camera 1000 as illustrated in FIG. 9E.

"superimposition character string" is separately stored in the storage unit 1009.

Figure 9F:
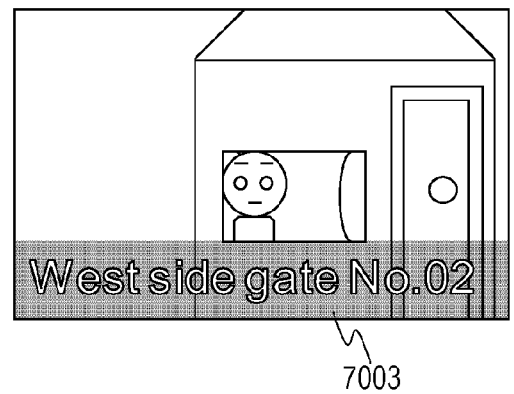

FIG. 9F is a diagram illustrating the captured image output from the image processing unit 1003. An OSD image 7003 output from the OSD generation unit 1007 is superimposed on the captured image of this example. The OSD image 7003 includes a character string "West side gate No. 02". This character string is set by updating the image superimposition setting generated by the CreateOSD command by the SetOSD command.

Subsequently, FIG. 11B is a diagram illustrating the SetOSD command. The command is an example of the command in 6057.

Although the image superimposition setting process illustrated in FIG. 12 is started by the controller 1008 when the monitoring camera 1000 receives the CreateOSD command from the client apparatus 2000 in this embodiment, the present invention is not limited to this.

For example, the image superimposition setting process illustrated in FIG. 12 may be started by the controller 1008 when the monitoring camera 1000 receives the SetOSD command from the client apparatus 2000. The SetOSD command is stored in the storage unit 1009.

Specifically, in step S9000, the controller 1008 starts an OSD setting process. The controller 1008 determines whether a SetOSD command has been received through the communication unit 1005, for example. When determining that the SetOSD command has been received through the communication unit 1005, the controller 1008 determines whether an image superimposition setting which may be identified by a value of OSDToken of the command has been stored in the storage unit 1009.

Subsequently, when the controller 1008 determines that the image superimposition setting which may be identified by the value of OSDToken of the command has been stored in the storage unit 1009, the process proceeds to step S9001.

When the controller 1008 determines that the image superimposition setting identified by the value of OSDToken of the command has not been stored in the storage unit 1009, the process does not proceed to step S9001. Similarly, when the controller 1008 determines that the CreateOSD command has not been received through the communication unit 1005, the process does not proceed to step S9001.

In step S9001, the controller 1008 determines whether an "input character string length" is equal to or smaller than a "settable maximum character string length". When the controller 1008 determines that the "input character string length" is equal to or smaller than the "settable maximum character string length", the process proceeds to step S9002. On the other hand, when the controller 1008 determines that the "input character string length" is not equal to or smaller than the "settable maximum character string length", the process proceeds to step S9008.

Note that the controller 1008 obtains the "settable maximum character string length" as follows. First, the controller 1008 reads all sizes of images which may be generated by the compressing/encoding unit 1004 from the storage unit 1009. Thereafter, the controller 1008 reads the "settable character string lengths" corresponding to all the read image sizes from the storage unit 1009.

Then the controller 1008 stores the longest one of the read "settable character string lengths" in the storage unit 1009 as the "settable maximum character string length". The "settable character string lengths" are determined by restriction of hardware or the like. Examples of the restriction of hardware include insufficient memory and a range of a region in which the OSD image is to be superimposed included in the captured image.

Furthermore, the controller 1008 obtains the "input character string length" as follows. First, the controller 1008 reads a character string described in association with PlainText in the SetOSD command received through the communication unit 1005 from the storage unit 1009. Next, the controller 1008 stores a length of the read character string in the storage unit 1009 as an "input character string length".

A process from step S9002 to step S9010 is the same as the process from step S9002 to step S9010 described above, and therefore, a description thereof is omitted.

As described above, in this embodiment, the controller 1008 is configured such that, when the length of the "input character string" received through the communication unit 1005 is not equal to or smaller than the "settable maximum character string length", a portion of the "input character string" corresponding to the "settable maximum character string length" is superimposed on the captured image. In this way, the "input character string" may be appropriately superimposed on the captured image depending on the length of the "input character string" received by the communication unit 1005.

Furthermore, in this embodiment, the controller 1008 is configured such that, when the "set character string" is equal to or smaller than the "superimposition-possible character string length" in step S9003 of FIG. 12, information representing an error is not transmitted to the client apparatus 2000 in step S9005. Such a configuration has benefits.

For example, it is assumed that the controller 1008 is configured such that information representing an error is transmitted to the client apparatus 2000 in step S9005. It is further assumed that the monitoring camera 1000 receives the CreateOSD command from the client apparatus 2000, and in a superimposition image setting process performed in response to the reception, information representing a normal operation is transmitted since the "set character string length" is equal to or smaller than the "superimposition-possible character string length".

A normal Create OSDResponse is an example of the information.

It is assumed that a length of the "superimposition-possible character string" becomes short since a size of the image to be subjected to the streaming delivery is set small after the transmission.

Even if a character string having a length the same as that of the character string described in association with PlainText of CreateOSDResponse is intended to be set by the SetOSD command after the length of the "superimposition-possible character string" becomes short, information representing an error may be transmitted.

Therefore, the client apparatus 2000 receives the information representing an error although the client apparatus 2000 intends to set the character string which is the same as the CreateOSD command or the character string having a length the same as that of the CreateOSD command to the monitoring camera 1000 by the SetOSD command. This causes confusion. The technique described above may prevent the occurrence of the confusion.

Furthermore, in this embodiment, the controller 1008 is configured such that a size of the image currently generated by the compressing/encoding unit 1004 is obtained in step S9003 of FIG. 12. Furthermore, although the controller 1008 is configured such that a portion of the "settable character string length" read in step S9001 corresponding to the obtained image size is set as the "superimposition-possible character string length" in step S9003, the present invention is not limited to this.

The controller 1008 may be configured such that a horizontal length of an image currently generated by the compressing/encoding unit 1004 is obtained first in step S9003. Furthermore, the controller 1008 may be configured such that a font corresponding to the size of the image is read from the storage unit 1009.

In addition, in this embodiment, although the controller 1008 is configured such that a quotient obtained by dividing the obtained horizontal length by a horizontal length of each character of the read font is set as the "superimposition-possible character string length".

Furthermore, in this embodiment, although the controller 1008 is configured such that it is determined whether the "input character string length" is equal to or smaller than the "settable maximum character string length", the present invention is not limited to this.

The controller 1008 may be configured such that the "settable character string length" corresponding to the size of the image currently generated by the compressing/encoding unit 1004 is read from the storage unit 1009 first in step S9001, for example. Moreover, the controller 1008 may be configured such that it is determined whether the "input character string length" is equal to or smaller than the read "settable character string length".

Furthermore, the controller 1008 may be configured such that, when it is determined that the "input character string length" is equal to or smaller than the read "settable character string length", the process proceeds to step S9002. In addition, the controller 1008 may be configured such that, when it is determined that the "input character string length" is not equal to or smaller than the read "settable character string length", the process proceeds to step S9008.

Moreover, in this embodiment, it is assumed that a "settable character string length" stored in the storage unit 1009 in association with a first image size is shorter than a "settable character string length" stored in the storage unit 1009 in association with a second image size which is larger than the first image size.

Similarly, it is assumed that the "settable character string length" stored in the storage unit 1009 in association with the second image size is shorter than a "settable character string length" stored in the storage unit 1009 in association with a third image size which is larger than the second image size.

Although the controller 1008 is configured such that the OSD setting process is started when the CreateOSD command or the SetOSD command is received in step S9000 of FIG. 12, the present invention is not limited to this. The controller 1008 may be configured such that the OSD setting process is started when the command of 6008 or the command of 6009 is received in step S9000.

Specifically, in step S9000, the controller 1008 determines whether the command of 6008 or the command of 6009 has been received. When it is determined that the command of 6008 or the command of 6009 has been received, the controller 1008 determines whether an image size specified by the command of 6008 or the command of 6009 coincides with a size of the image currently generated by the compressing/encoding unit 1004.

When the controller 1008 determines that the image size specified by the command of 6008 or the command of 6009 coincides with the size of the image currently generated by the compressing/encoding unit 104, the process does not proceed to step S9001.

On the other hand, when the controller 1008 determines that the image size specified by the command of 6008 or the command of 6009 does not coincide with the size of the image currently generated by the compressing/encoding unit 104, the process proceeds to step S9001. Here, the process proceeds to step S9001, and in addition, the controller 1008 changes the size of the image generated by the compressing/encoding unit 1004 to the specified image size.

When the controller 1008 determines that the command of 6008 or the command of 6009 has not been received, the process does not proceed to step S9001.

Second Embodiment

Next, a monitoring camera 1000 according to a second embodiment of the present invention will be described with reference to FIG. 12. Components the same as those of the foregoing embodiment are denoted by reference numerals the same as those of the foregoing embodiment, and descriptions thereof are omitted.

In step S9005 of the first embodiment, the controller 1008 causes the storage unit 1009 to store a portion of the "set character string corresponding to the "superimposition-possible character string length" as the "superimposition character string". On the other hand, in step S9005 of the second embodiment, a controller 1008 causes a storage unit 1009 to store, in addition to the storage of the first embodiment, a portion of a "set character string" corresponding to a "superimposition-possible character string length" as the "set character string".

Next, an OSD setting process performed by the monitoring camera 1000 of this embodiment will be described with reference to FIG. 12. First, a process from step S9000 to step S9004 of this embodiment is the same as the process from step S9000 to step S9004 of the first embodiment, and therefore, a description thereof is omitted.

In step S9005, the controller 1008 stores a portion of the "set character string" stored in the storage unit 1009 in step S9002 or step S9008 corresponding to a "superimposition-possible character string length" in the storage unit 1009 as a "superimposition character string".

Furthermore, the controller 1008 updates the "set character string" stored in the storage unit 1009 in step S9002 or step S9008 by the portion of the "set character string" corresponding to the "superimposition-possible character string length".

A process from step S9006 to step S9011 of this embodiment is the same as the process from step S9006 to step S9011 of the first embodiment, and therefore, a description thereof is omitted.

As described above, in this embodiment, the controller 1008 is configured such that the "set character string" stored in the storage unit 1009 in step S9002 or step S9008 is updated by the portion of the "set character string" corresponding to the "superimposition-possible character string length".

By this, the "set character string" stored in the storage unit 1009 and the "superimposition character string" stored in the storage unit 1009 are the same as each other, that is, only one character string is stored. Accordingly, when the "superimposition-possible character string length" is equal to or smaller than the "input character string length", a length of the "superimposition-possible character string" stored in the storage unit 1009 is short and a length of the "set character string" stored in the storage unit 1009 is also short.

Note that, in this embodiment, the controller 1008 transmits information representing an error to a client apparatus 2000 through a communication unit 1005 as a response of 6055 or 6057 in step S9005. This is because an "input character string" stored in the storage unit 1009 is different from an input character string specified by a command of 6055 or 6057 received in step S9000.

Furthermore, it is assumed that the controller 1008 receives a command of 6056 from the client apparatus 2000 through the communication unit 1005 after a process in step S9005 of this embodiment is executed. In this case, the controller 1008 transmits a response of 6056 to the client apparatus 2000 through the communication unit 1005, and a length of a character string included in the response is shorter than a length of an input character string included in the response of 6055 transmitted in step S9005.

Third Embodiment

Next, a monitoring camera 1000 and a client apparatus 2000 according to a third embodiment of the present invention will be described with reference to FIGS. 12 and 13. Components the same as those of the foregoing embodiment are denoted by reference numerals the same as those of the foregoing embodiment, and descriptions thereof are omitted.

In step S9009 of the first embodiment, the controller 1008 transmits information representing a normal operation to the client apparatus 2000 through the communication unit 1005 as a response of 6055 or 6057. Furthermore, in step S9010 of the first embodiment, the controller 1008 transmits information representing an error to the client apparatus 2000 through the communication unit 1005 as a response of 6055 or 6057.

On the other hand, in the third embodiment, a "settable character string length" and a "superimposition-possible character string length" are added to responses transmitted by a controller 1008 to the client apparatus 2000 in step S9009 and step S9010.

Next, an OSD setting process performed by the monitoring camera 1000 of this embodiment will be described with reference to FIG. 12. First, a process from step S9000 to step S9008 of this embodiment is the same as the process from step S9000 to step S9008 of the first embodiment, and therefore, a description thereof is omitted.

In step S9009, the controller 1008 transmits information representing a normal operation to the client apparatus 2000 through a communication unit 1005 as a response of 6055 or 6057. Here, the response includes a "settable maximum character string length" used in a determination performed in step S9001. The response further includes a "superimposition-possible character string length" used in a determination performed in step S9003.

In step S9010, the controller 1008 transmits information representing an error to the client apparatus 2000 through the communication unit 1005 as the response of 6055 or 6057. Here, the response includes the "settable maximum character string length" used in the determination performed in step S9001. The response further includes the "superimposition-possible character string length" used in a determination performed in step S9003.

Figure 13:
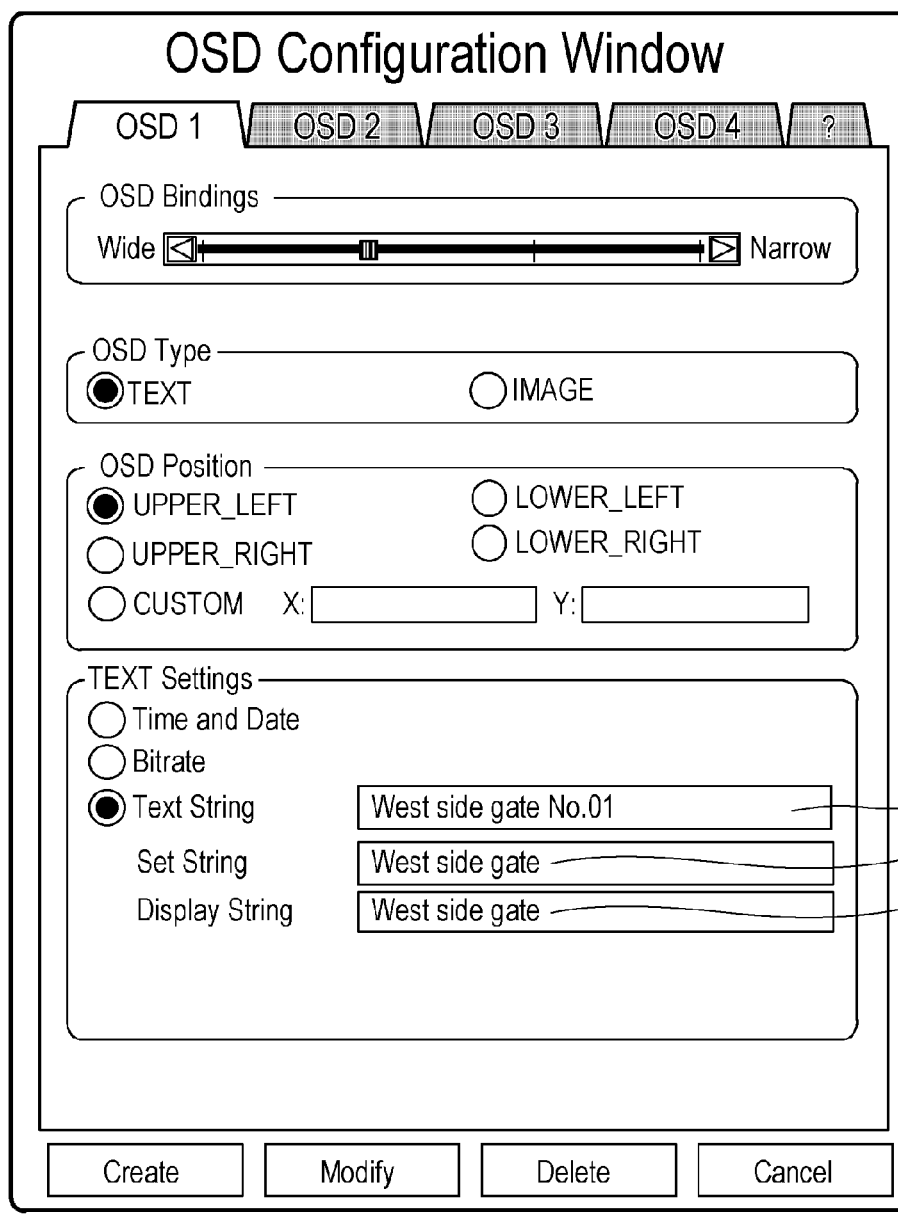
FIG. 13 is a diagram illustrating display of a superimposition image setting screen according to the first embodiment of the present invention.

Next, FIG. 13 is a diagram illustrating display of a superimposition image setting screen (that is, an OSDConfiguration setting screen) of this embodiment. Note that the client apparatus 2000 displays the screen of this display example when receiving the response transmitted in step S9009 or step S9010. The received response is stored in a storage unit 2006.

A reference numeral 10000 of FIG. 13 denotes a text box used to display a character string. A character string displayed in the text box 10000 is described in association with a PlainText field in a CreateOSD command. Specifically, the text box 10000 is used to display an "input character string".

When a CreateOSD command illustrated in FIG. 10 is used, for example, a controller 2005 reads a character string corresponding to a PlainText field in the command from the storage unit 2006. Subsequently, the controller 2005 displays the read character string in the text box 10000. By this, "West side gate No. 01" is displayed in the text box 10000 as illustrated in FIG. 13.

A reference numeral 10001 is a text box used to display a character string. A character string displayed in the text box 10001 is a portion of the character string described in association with the PlainText field in the CreateOSD command. Specifically, the text box 10001 is used to display a "set character string".

When the CreateOSD command illustrated in FIG. 10 is used, for example, the controller 2005 reads a character string associated with a PlainText field in the command from the storage unit 2006. Thereafter, the controller 2005 reads a "settable maximum character string length" described in the response transmitted in step S9009 or step S9010 from the storage unit 2006.

The controller 2005 causes the text box 10001 to display a portion of the read character string which corresponds to the read character string length. By this, "West side gate" is displayed in the text box 10001 as illustrated in FIG. 13.

A reference numeral 10002 denotes a text box used to display a character string. A character string displayed in the text box 10002 is a portion of the character string described in association with the PlainText field in the CreateOSD command. Specifically, the text box 10002 is used to display a "superimposition character string".

When the CreateOSD command illustrated in FIG. 10 is used, for example, the controller 2005 reads a character string corresponding to the PlainText field in the command from the storage unit 2006.

Thereafter, the controller 2005 reads a "superimposition-possible character string length" described in the response transmitted in step S9009 or step S9010 from the storage unit 2006.

The controller 2005 displays a portion of the read character string which corresponds to the read character string length in the text box 10002. By this, "West side gate" is displayed in the text box 10002 as illustrated in FIG. 13.

As described above, in this embodiment, the controller 1008 is configured such that the "settable maximum character string length" and the "superimposition-possible character string length" are added to the response transmitted in step S9009 and step S9010. By this, the client apparatus 2000 may obtain the "settable maximum character string length" and the "superimposition-possible character string length" in the monitoring camera 1000.

Furthermore, in this embodiment, the controller 2005 is configured such that a "set character string" is displayed in accordance with the "settable maximum character string length" described in the response transmitted in step S9009 or step S9010. Here, the "set character string" to be displayed corresponds to a portion of the character string associated with the PlainText field in the command of 6055 which corresponds to the described "settable maximum character string length".

By this, the client apparatus 2000 may allow a user to check a character string which may be set to the monitoring camera 1000 in the character string (an input character string) described in association with the CreateOSD command.

Furthermore, in this embodiment, the controller 2005 is configured such that the "superimposition character string" is displayed in the screen illustrated in FIG. 13 in accordance with the "superimposition-possible character string length" described in the response transmitted in step S9009 or step S9010. Here, the "set character string" to be displayed corresponds to a portion of the character string associated with the PlainText field in the command of 6055 which corresponds to the described "superimposition-possible character string length".

By this, the client apparatus 2000 may allow a user to check a portion of the character string (the input character string) described in association with the CreateOSD command which is to be superimposed by the monitoring camera 1000.

Note that, in this embodiment, although the controller 1008 is configured such that the "settable maximum character string length" is described in the response of 6055 or 6057 in step S9009 and step S9010, the present invention is not limited to this. The controller 1008 may be configured such that the "settable character string length" corresponding to a size of an image currently captured by the monitoring camera 1000 is described in the response in step S9009 and step S9010.

Other Embodiments

The present invention is realized by executing the following process. Specifically, software (programs) which realizes the functions of the foregoing embodiments is supplied to a system or an apparatus through a network or a various storage medium, and a computer (or a CPU, an MPU, or the like) included in the system or the apparatus reads and executes the programs.

The some embodiments of the present invention have been described hereinabove. The present invention is not limited to this, and various modifications and changes may be made within the scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-173363, filed Aug. 23, 2013, which is hereby incorporated by reference herein in its entirety.

What is claimed is:
1. An apparatus comprising:
an image pickup unit configured to capture an image of an object;
a reception unit configured to receive superimposition information from an external apparatus through a network;

a determination unit configured to determine whether the received superimposition information is larger than a first amount determined based on the image captured by the image pickup unit;

an output unit configured to output part of the received superimposition information when the superimposition information is larger than the first amount and output the received superimposition information when the superimposition information is not larger than the first amount;

a superimposition unit configured to superimpose the superimposition information output from the output unit on the captured image; and a delivery unit configured to deliver the captured image on which the superimposition information is superimposed to the external apparatus.

2. An apparatus comprising:

an image pickup unit configured to capture an image of an object;

a reception unit configured to receive superimposition information from an external apparatus through a network;

a first determination unit configured to determine whether the received superimposition information is larger than a first amount determined based on the image captured by the image pickup unit;

an output unit configured to output part of the received superimposition information when the superimposition information is larger than the first amount and output the received superimposition information when the superimposition information is not larger than the first amount;

a second determination unit configured to determine whether the output superimposition information is larger than a second amount determined based on the image captured by the image pickup unit;

a generation unit configured to generate part of the output superimposition information when the superimposition information is larger than the second amount and generate the output superimposition information when the superimposition information is not larger than the second amount; and a superimposition unit configured to superimpose the generated superimposition information on the captured image.

3. The apparatus according to claim 2, wherein the larger the captured image is, the larger the second amount is.

4. The apparatus according to claim 3, further comprising:

a changing unit configured to change a size of the captured image, wherein the second determination unit determines whether the output superimposition information is larger than the second amount when the size is changed.

5. A system including an external apparatus and an apparatus, wherein the external apparatus includes a transmission unit configured to transmit superimposition information to the apparatus through the network, and the apparatus includes an image pickup unit configured to capture an image of an object, a determination unit configured to determine whether the transmitted superimposition information is larger than a first amount, an output unit configured to output part of the transmitted superimposition information when the superimposition information is larger than the first amount and output the transmitted superimposition information when the superimposition information is not larger than the first amount, a superimposition unit configured to superimpose the output superimposition information on the captured image, and a delivery unit configured to deliver the captured image on which the superimposition information is superimposed to the external apparatus.

6. A method for controlling an apparatus, the method comprising:

capturing an image of an object;

receiving superimposition information from an external apparatus through a network;

determining whether the received superimposition information is larger than a first amount determined based on the captured image;

outputting part of the received superimposition information when the received superimposition information is larger than the first amount and outputting the received superimposition information when the received superimposition information is not larger than the first amount;

superimposing the output superimposition information on the captured image; and delivering the captured image on which the superimposition information is superimposed to the external apparatus.

7. A method for controlling a system including an external apparatus and an apparatus, comprising:

transmitting superimposition information to an image pickup apparatus;

capturing an image of an object;

determining whether the transmitted superimposition information is larger than a first amount determined based on the captured image;

outputting part of the transmitted superimposition information when the transmitted superimposition information is larger than the first amount and outputting the transmitted superimposition information when the transmitted superimposition information is not larger than the first amount;

superimposing the output superimposition information on the captured image; and delivering the captured image on which the superimposition information is superimposed to the external apparatus.

8. A non-transitory computer readable storage medium storing a computer-executable program of instructions for causing a computer to perform a method comprising:

capturing an image of an object;

receiving superimposition information from an external apparatus through a network;

determining whether the received superimposition information is larger than a first amount determined based on the captured image;

outputting part of the received superimposition information when the received superimposition information is larger than the first amount and outputting the received superimposition information when the received superimposition information is not larger than the first amount;

superimposing the output superimposition information on the captured image; and delivering the captured image on which the superimposition information is superimposed to the external apparatus.

9. A non-transitory computer readable storage medium storing a computer-executable program of instructions, that controls a system including an external apparatus and an apparatus, for causing a computer to perform a method comprising:

transmitting superimposition information to an image pickup apparatus through the network;

capturing an image of an object;

determining whether the transmitted superimposition information is larger than a first amount determined based on the captured image;

outputting part of the transmitted superimposition information when the transmitted superimposition information is larger than the first amount and outputting the transmitted superimposition information when the transmitted superimposition information is not larger than the first amount;

superimposing the output superimposition information on the captured image; and delivering the captured image on which the superimposition information is superimposed to the external apparatus.

* * * * *